US012725843B2

(12) United States Patent
Mikic et al.

(10) Patent No.: US 12,725,843 B2
(45) Date of Patent: Sep. 1, 2026

(54) METHOD AND SYSTEM FOR SAFELY LANDING A BATTERY POWERED ELECTRIC VTOL AIRCRAFT IN A LOW CHARGE CONDITION

(71) Applicant: Joby Aero, Inc., Santa Cruz, CA (US)

(72) Inventors: Gregor Veble Mikic, Santa Cruz, CA (US); Joeben Bevirt, Santa Cruz, CA (US); Alex Stoll, Santa Cruz, CA (US); Brian Matthew Uznanski, San Francisco, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 433 days.

(21) Appl. No.: 17/364,442

(22) Filed: Jun. 30, 2021

(65) Prior Publication Data

US 2022/0011782 A1 Jan. 13, 2022

Related U.S. Application Data

(60) Provisional application No. 63/046,516, filed on Jun. 30, 2020.

(51) Int. Cl.
*H01M 10/48* (2006.01)
*B60L 50/60* (2019.01)
(Continued)

(52) U.S. Cl.
CPC ............. *H01M 10/48* (2013.01); *B60L 50/60* (2019.02); *B60L 58/12* (2019.02); *B60L 58/24* (2019.02);
(Continued)

(58) Field of Classification Search
CPC ...... G05D 1/101; G05D 1/0676; B60L 50/60; B60L 58/12; B60L 58/24; B60L 2200/10;
(Continued)

(56) References Cited

U.S. PATENT DOCUMENTS 10,350,960 B1 * 7/2019 Long .................. H01M 10/663
2014/0129056 A1 * 5/2014 Criado .................. B64U 10/25 701/4
(Continued)

FOREIGN PATENT DOCUMENTS

CN 107492938 * 12/2017
CN 107492938 A * 12/2017 ............ H02J 7/0065
(Continued)

OTHER PUBLICATIONS

English translation for reference CN107492938 (Year: 2017).*
(Continued)

*Primary Examiner* — Hongye Liang
(74) *Attorney, Agent, or Firm* — Michael A. Guth

(57) ABSTRACT

A system and method for use with a VTOL aircraft with batteries in a state of deep discharge which prepares the aircraft for a safe vertical landing despite the deep discharge initial condition. The method may include preparing the batteries for an intense burst of power as may be needed during the vertical landing. The method may include idling the battery, thermally conditioning the battery, and may further include charging the batteries by regenerative use of the rotors. The preparation of the batteries may then allow for a burst of power used for landing the aircraft.

17 Claims, 14 Drawing Sheets

S100

(51) Int. Cl.

| | |
|---|---|
| ***B60L 58/12*** | (2019.01) |
| ***B60L 58/24*** | (2019.01) |
| ***B64D 27/34*** | (2024.01) |
| ***B64D 27/357*** | (2024.01) |
| ***B64D 31/06*** | (2006.01) |
| ***B64D 31/16*** | (2024.01) |
| ***G05D 1/00*** | (2006.01) |
| ***H01M 10/44*** | (2006.01) |
| ***H01M 10/613*** | (2014.01) |
| ***H01M 10/615*** | (2014.01) |
| ***H01M 10/625*** | (2014.01) |
| ***H01M 10/6556*** | (2014.01) |
| ***H01M 10/663*** | (2014.01) |
| *H02J 7/82* | (2026.01) |

(52) U.S. Cl.

CPC ........... *B64D 27/34* (2024.01); *B64D 27/357* (2024.01); *B64D 31/06* (2013.01); *B64D 31/16* (2024.01); *G05D 1/101* (2013.01); *H01M 10/44* (2013.01); *H01M 10/613* (2015.04); *H01M 10/615* (2015.04); *H01M 10/625* (2015.04); *H01M 10/6556* (2015.04); *H01M 10/663* (2015.04); *B60L 2200/10* (2013.01); *H01M 2220/20* (2013.01); *H02J 7/82* (2026.01)

(58) Field of Classification Search

CPC ........ B64D 27/24; B64D 31/06; B64D 45/04; H01M 10/44; H01M 10/613; H01M 10/615; H01M 10/625; H01M 10/6556; H01M 10/663; H01M 2220/20; H01M 10/48; H02J 7/0048; H02J 2310/44; H02J 7/0047; H02J 7/0068; Y02E 60/10; Y02T 10/72; Y02T 50/60; Y02T 10/70; Y02T 50/50; B64C 29/0033

See application file for complete search history.

(56) References Cited

U.S. PATENT DOCUMENTS

| | | | | |
|---|---|---|---|---|
| 2016/0031554 | A1 | 2/2016 | Eshkenazy et al. | |
| 2016/0244159 | A1 | 8/2016 | Bevirt | |
| 2017/0284371 | A1* | 10/2017 | Gamble | F03D 17/00 |
| 2018/0321690 | A1* | 11/2018 | Vander Lind | B64C 29/0033 |
| 2020/0062416 | A1 | 2/2020 | Mikic et al. | |
| 2022/0281351 | A1* | 9/2022 | Bartsch | B60L 58/27 |

FOREIGN PATENT DOCUMENTS

| | | | | |
|---|---|---|---|---|
| WO | WO2016/109408 | * | 1/2015 | |
| WO | WO-2016109408 | A1 * | 7/2016 | B64C 27/16 |
| WO | WO 2020/022266 | A1 | 1/2020 | |

OTHER PUBLICATIONS

Wu Xiaogang et al, "Analysis of Low Temperature Preheating Effect Based on Battery Temperature-Rise Model", Aug. 1, 2017, Energies, 2017, 10, 1121, pp. 1-15 (Year: 2017).*

Zhang, Yong, CN107492938, machine translated. Dec. 19, 2017 (Year: 2017).*

* cited by examiner

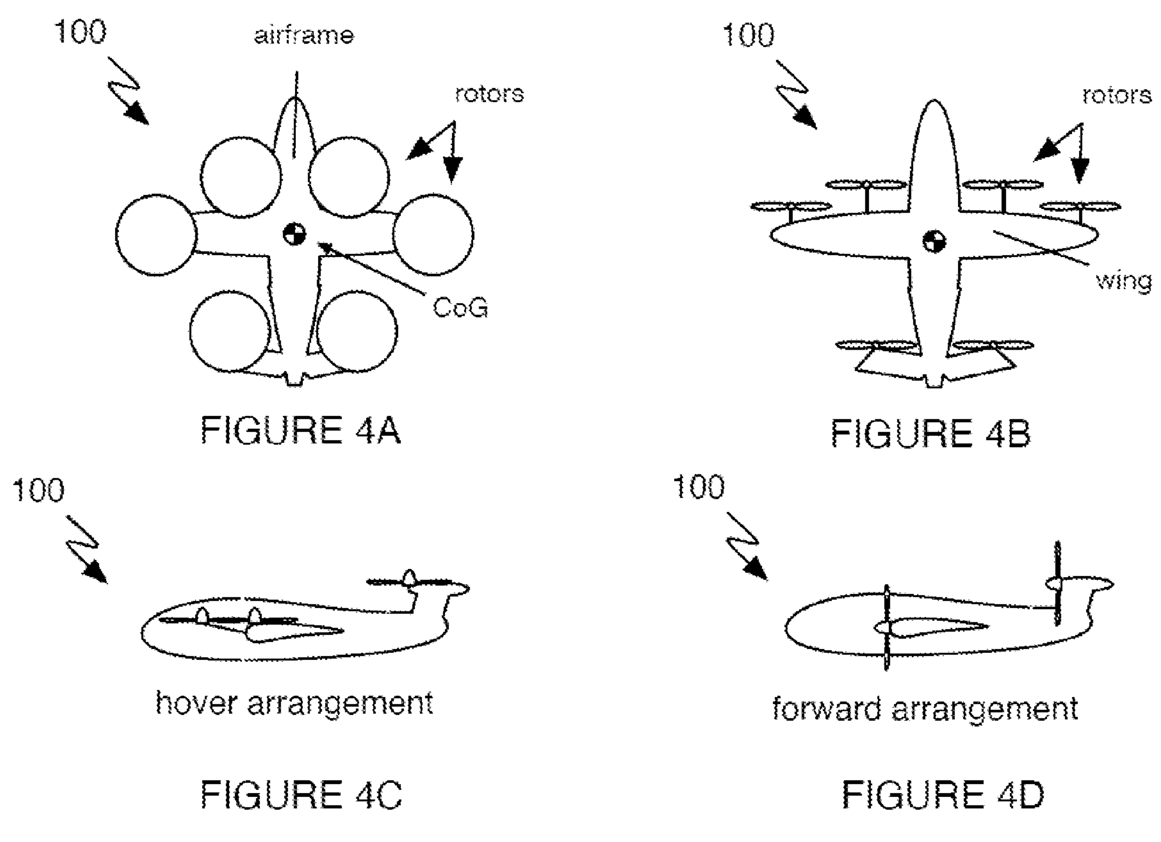
FIGURE 4A
FIGURE 4B
FIGURE 4C
FIGURE 4D
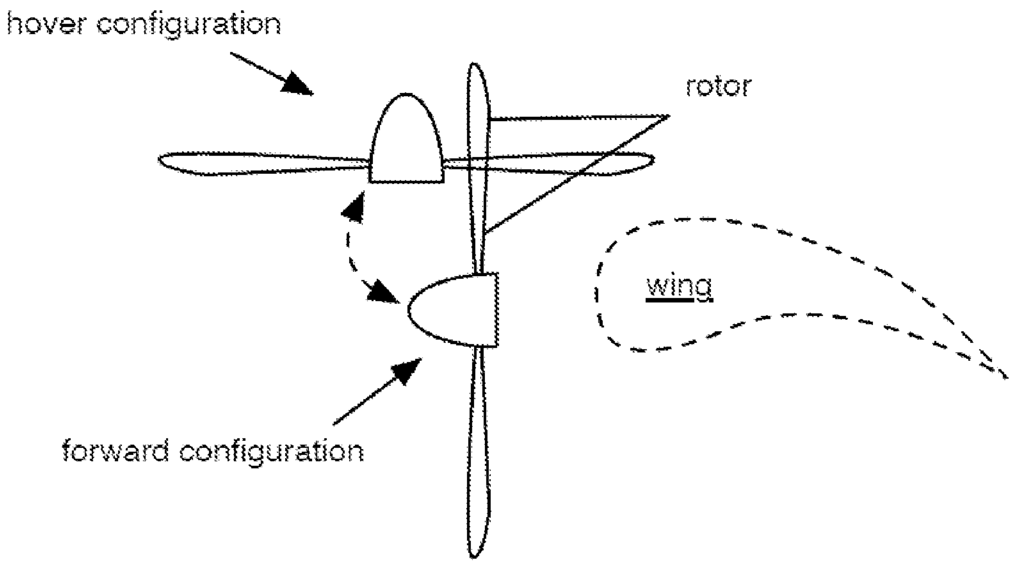
FIGURE 5

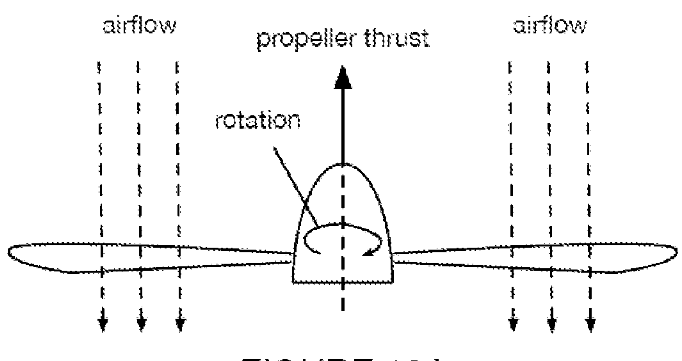
FIGURE 10A
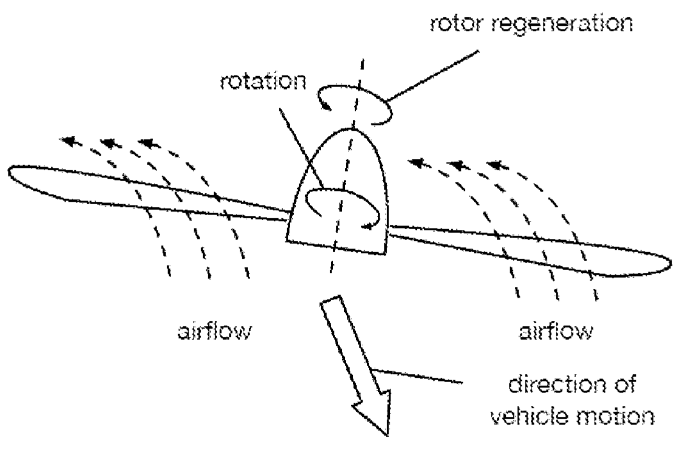
FIGURE 10B
FIGURE 10C

METHOD AND SYSTEM FOR SAFELY LANDING A BATTERY POWERED ELECTRIC VTOL AIRCRAFT IN A LOW CHARGE CONDITION

CROSS-REFERENCE TO RELATED APPLICATIONS

This application claims priority to U.S. Provisional Patent Application No. 63/046,516 to Bevirt et al., filed Jun. 30, 2020, which is hereby incorporated by reference in its entirety.

BACKGROUND

Field of the Invention

This invention relates generally to the aviation field, and more specifically to a new and useful landing method in the aviation field.

Description of Related Art

There are generally three types of vertical take-off and landing (VTOL) configurations: wing type configurations having a fuselage with rotatable wings and engines or fixed wings with vectored thrust engines for vertical and horizontal translational flight; helicopter type configurations having a rotor mounted above which provides lift and thrust; and ducted type configurations having a fuselage with a ducted rotor system which provides translational flight as well as vertical takeoff and landing capabilities.

The amount of thrust required for winged VTOL aircraft to take-off in a vertical take-off scenario greatly exceeds the thrust needed to keep the same vehicle aloft during forward flight, when the wings are providing lift. The amount of thrust required to transition from a vertical take-off mode to horizontal, forward, flight mode may also be quite high. An electrically powered VTOL aircraft may use batteries which can run down their power such that they can provide sufficient power for continued forward flight, but would be unable to provide the higher power needed for the aircraft to engage in its typical vertical landing. In this unwanted scenario the aircraft may need to engage a series of steps which may allow it produce the power needed for a safe vertical landing.

What is needed is a method and system of operating an electrically powered aircraft which allows a VTOL aircraft with batteries with states of charge too low for normal vertical landing maneuvers to nonetheless engage in safe vertical landing.

BRIEF DESCRIPTION OF THE FIGURES

FIG. 4A is a top view schematic representation of an example aircraft in a hover arrangement.

FIG. 4B is a top view schematic representation of an example aircraft in a forward arrangement.

FIG. 4C is a side view schematic representation of an example aircraft in a hover arrangement.

FIG. 4D is a side view schematic representation of an example aircraft in a forward arrangement.

FIG. 5 is a side view schematic representation of an example of a rotor configurable between a hover configuration and a forward configuration.

FIG. 10A is a schematic representation of an example of airflow through a powered rotor.

FIG. 10B is a schematic representation of an example of airflow through a rotor during regeneration.

FIG. 10C is a schematic representation of an example of airflow through a rotor during thrust vector control.

SUMMARY

Figure 1:
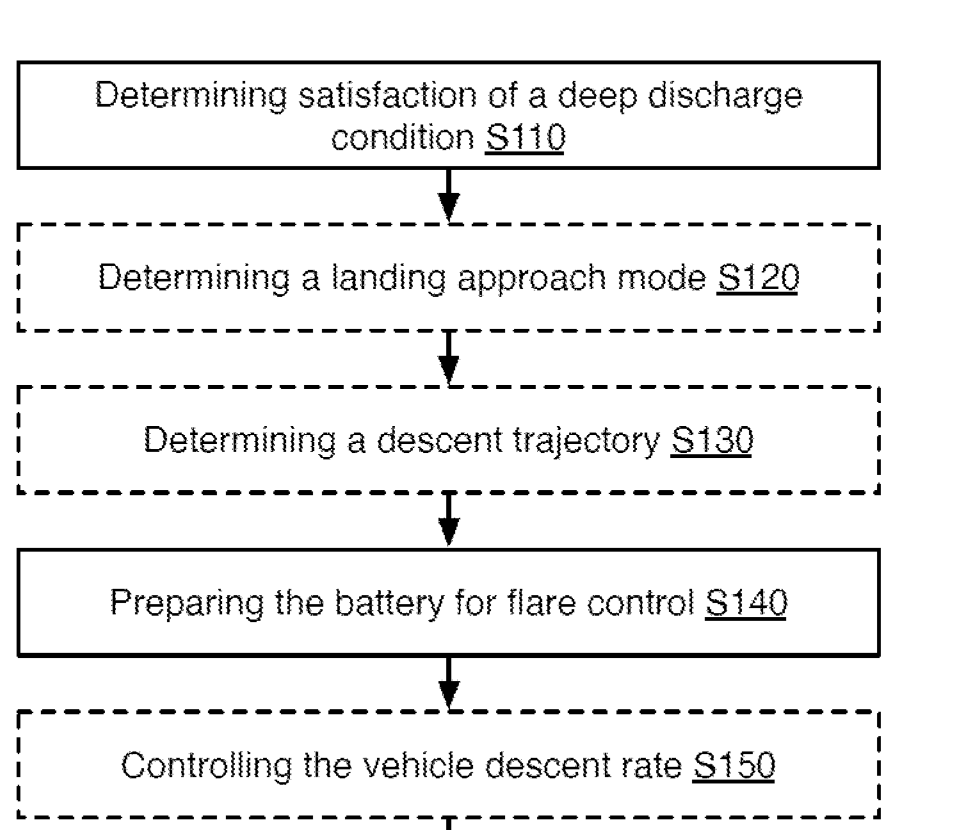
FIG. 1 is a diagrammatic representation of the method.

A system and method for use with a VTOL aircraft with batteries in a state of deep discharge which prepares the aircraft for a safe vertical landing despite the deep discharge initial condition. The method may include preparing the batteries for an intense burst of power as may be needed during the vertical landing. The method may include idling the battery, thermally conditioning the battery, and may further include charging the batteries by regenerative use of the rotors. The preparation of the batteries may then allow for a burst of power used for landing the aircraft.

DETAILED DESCRIPTION

The following description of the preferred embodiments of the invention is not intended to limit the invention to these preferred embodiments, but rather to enable any person skilled in the art to make and use this invention.

With a winged electric VTOL aircraft the power demands to remain aloft in forward flight may be significantly less than the power required to safely engage in a vertical landing. The amount of electrical power needed in the short time in which it must be delivered for vertical landing may not be achievable if the batteries are in too low of a state of charge. In some circumstances, a VTOL aircraft may find itself flying in a forward flight regime beyond a point in time where there will be power available for a vertical landing. The circumstance may be referred to as a deep discharge condition. This may come about due to an altered flight plan, for example, where there has been a problem at an originally determined landing location, or for other reasons. In some aspects, it may be determined during flight that a deep discharge condition will be reached before arriving at the landing site.

With the system and method of the present invention, the aircraft may undertake a series of steps which will allow it to prepare the aircraft for an achievable safe landing. This safe landing may be undertaken even though the batteries don't have enough charge for their conventional landing sequence. In some aspects, the batteries may even be fully or nearly depleted but can undergo a series of steps that allows for a power burst to affect a safe landing, although with the possibility of damaging the batteries.

The method S100 can include: determining satisfaction of a deep discharge condition S110, preparing the battery for flare control S140, controlling the vehicle descent rate S150, and arresting vehicle motion S160. The method can optionally include: determining a landing approach mode S120 and determining a descent trajectory S130. Preparing the battery for flare control can include: idling (or priming) the battery, regenerating energy, and thermally conditioning the batteries. However, the method S100 can additionally or alternatively include any other suitable elements.

The method S100 is preferably implemented in conjunction with an aircraft (e.g., the system can include an aircraft). The aircraft is preferably a VTOL airplane (e.g., a multimodal aircraft) and/or a rotorcraft, but can additionally or alternatively include any suitable aircraft. The rotorcraft is preferably a tiltrotor aircraft (an example is shown in FIG. 5) with a plurality of aircraft propulsion systems (e.g., rotor assemblies, rotor systems, etc.), operable between a forward arrangement (examples are shown in FIG. 4B and FIG. 4D) and a hover arrangement (examples are shown in FIG. 4A and FIG. 4C). However, the rotorcraft can alternatively be a fixed wing aircraft with one or more rotor assemblies or propulsion systems, a helicopter with one or more rotor assemblies (e.g., wherein at least one rotor assembly or aircraft propulsion system is oriented substantially axially to provide horizontal thrust), a tiltwing aircraft, a wingless aircraft (e.g., an electric helicopter, electric multi-copter), and/or any other suitable rotorcraft or vehicle propelled by rotors. The rotors and/or rotor assemblies can have a fixed or variable pitch. The aircraft preferably includes an all-electric powertrain (e.g., battery powered electric motors) to drive the one or more rotor assemblies, but can additionally or alternatively include a hybrid powertrain (e.g., a gas-electric hybrid including an internal-combustion generator), an internal-combustion powertrain (e.g., including a gas-turbine engine, a turboprop engine, etc.), and any other suitable powertrain or propulsion systems.

The aircraft can include any suitable form of power storage or power storage unit (battery, flywheel, ultra-capacitor, battery, fuel tank, etc.) which powers a flight component (e.g., rotor, propeller, etc.). The preferred power/fuel source is a battery, which is similarly the preferred means of regenerated energy storage, however the system and/or method could reasonably be employed with any suitable power/fuel source configured to store regenerated energy (electrically or otherwise) from a flight component (e.g., rotor, propeller, propulsion system, etc.). The aircraft can operate with batteries as the primary form of energy storage and/or a secondary form of battery storage (e.g., secondary battery, regenerative storage, etc.). The aircraft can include auxiliary power sources (e.g., backup batteries) or exclude auxiliary power sources. The aircraft can employ batteries with any suitable cell chemistries (e.g., Li-ion, nickel cadmium, etc.) in any suitable electrical architecture or configuration (e.g., multiple packs, bricks, modules, cells, etc.; in any combination of series and/or parallel architecture).

Preferably, the aircraft can be configured to sustain flight in conditions where greater than a threshold percentage of kinetic energy (and/or inertia) of the aircraft is translational. Conversely, the aircraft can be configured to sustain flight in conditions where less than a threshold percentage of kinetic energy (and/or inertia) of the aircraft is rotational. The threshold percentage of kinetic energy (and/or inertia) can be: 75%, 50%, 35%, 25%, 20%, 10%, and/or any other suitable threshold. In variations, the aircraft can sustain flight with translational kinetic energy strictly greater than rotational kinetic energy (e.g., in one or more modes of flight, in a forward configuration, during cruise, etc.) and/or with a maximum rotational kinetic energy (and/or rotational inertia) below a predetermined threshold. However, the method can be implemented in conjunction with any suitable aircraft having any suitable rotational kinetic energy (or rotational inertia) and/or translational kinetic energy (or translational inertia). In the example of the aircraft embodiment described below, the percentage of energy that is rotational may be approximately 2% during typical forward flight, and may be in the range of 1-5%, and may then rise to 90-100% during hover, as seen in vertical take-off and landing operations, and may be in the range of 85-100%. In an auto-rotative descent, the percentage of energy that is rotational may be in the range of 10-25%. This percentage as seen in an auto-rotative descent stand is contrast to a helicopter, where the percentage may be substantially higher.

The rotational kinetic energy and/or rotational inertia of the aircraft as referenced herein can be directly associated with the aircraft/airframe (e.g., about the center of mass) and/or associated with the rotors (e.g., about a respective rotor axis), but can otherwise suitably refer to any suitable subset of rotating aircraft components.

The aircraft can be autonomous (e.g., in all flight modes, in some flight modes), semi-autonomous, human operated, and/or otherwise suitably controlled.

In a specific example, the system integrated into an electric tiltrotor aircraft including a plurality of tiltable rotor assemblies (e.g., six tiltable rotor assemblies). The electric tiltrotor aircraft can operate as a fixed wing aircraft, a rotary-wing aircraft, and in any liminal configuration between a fixed and rotary wing state (e.g., wherein one or more of the plurality of tiltable rotor assemblies is oriented in a partially rotated state). The control system of the electric tiltrotor aircraft in this example can function to command and control the plurality of tiltable rotor assemblies within and/or between the fixed wing arrangement and the rotary-wing arrangement.

In variants, the method can be implemented in conjunction with the redundant power architecture and/or tiltrotor aircraft power configuration described in U.S. application Ser. No. 16/428,794, filed 31 May 2019, which is incorporated in its entirety by this reference.

Figure 14A:
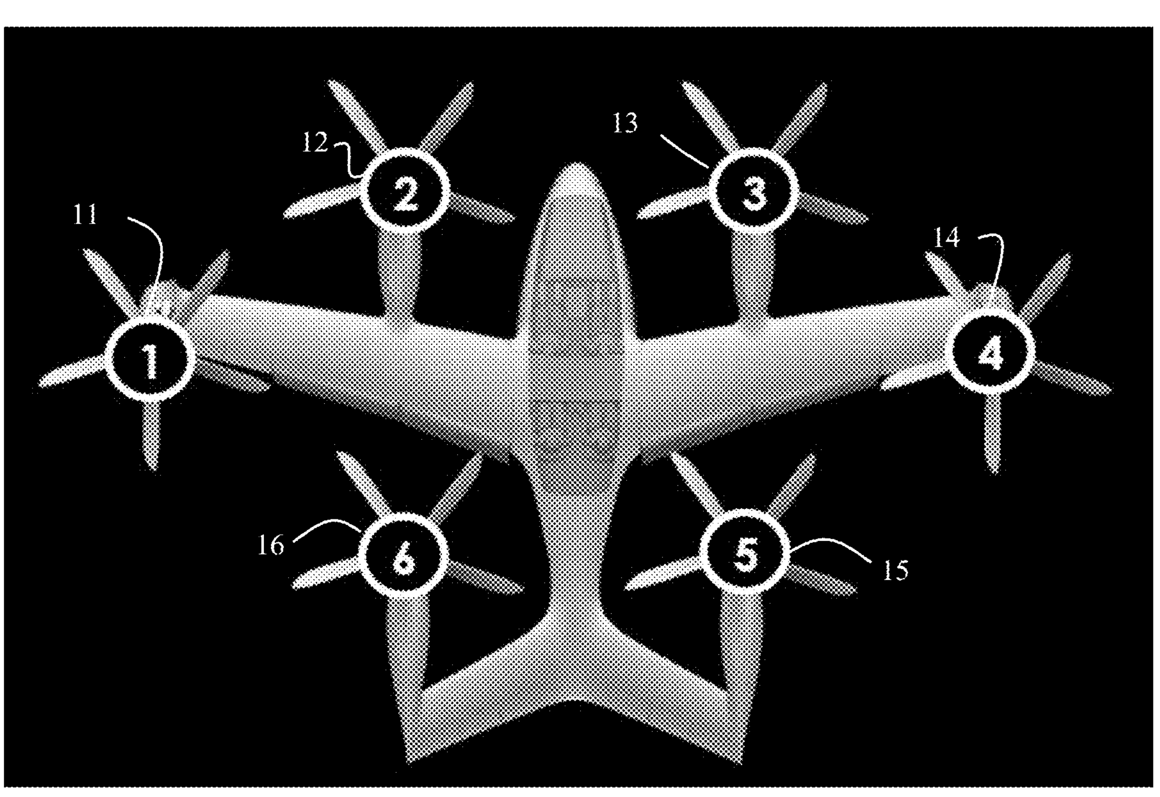
FIG. 14A illustrates a layout of a VTOL aircraft according to some embodiments of the present invention.
Figure 14B:
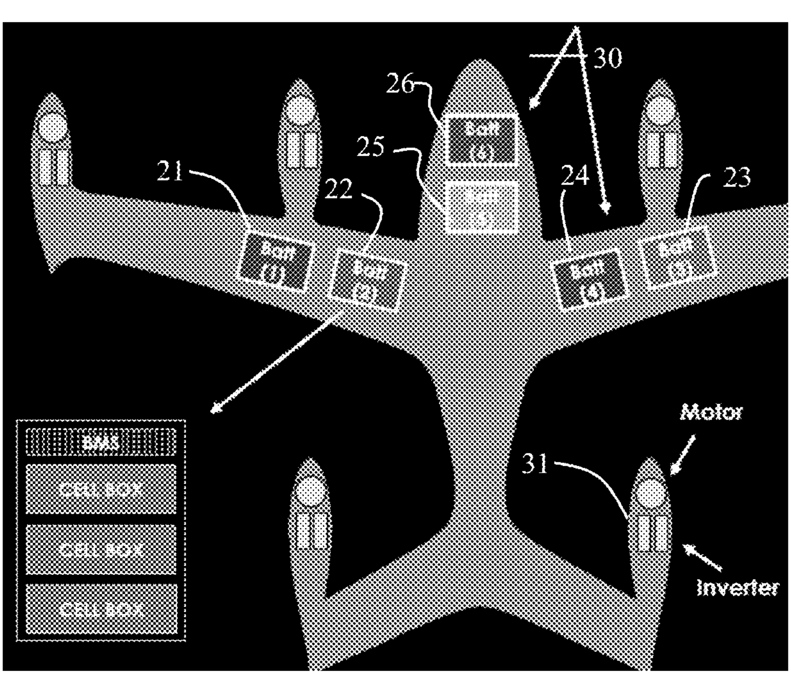
FIG. 14B illustrates a battery configuration according to some embodiments of the present invention.

FIGS. 14A and 14B illustrate an exemplary embodiment of an aircraft according to some embodiments of the present invention. FIG. 14A illustrates a layout of six motors on a VTOL aircraft in an exemplary embodiment using six propulsion assemblies and six batteries. FIG. 14B illustrates a layout of six batteries in a VTOL aircraft in an exemplary embodiment using six propulsion assemblies and six batteries. In this exemplary embodiment, there are six batteries and six motors. Each of the motors is powered by two separate batteries. The disparate locations 30 of the batteries also enhance the reliability and fault tolerance of the power system architecture. Each battery is powering two separate motors. In some aspects, each of the motors is wound with two sets of windings, and each set of windings receives power from a different battery, although other layouts are envisioned. As discussed below with regard to FIG. 12, each of the six batteries supplies two power inverters 31, for a total of 12 power inverters. The nominal voltage of the batteries is 600V. Each of the six propulsion motors has two sets of windings, with each motor powered by two inverters, one for each set of windings. The two inverters powering a single motor each are supplied power by different batteries.

Figure 12:
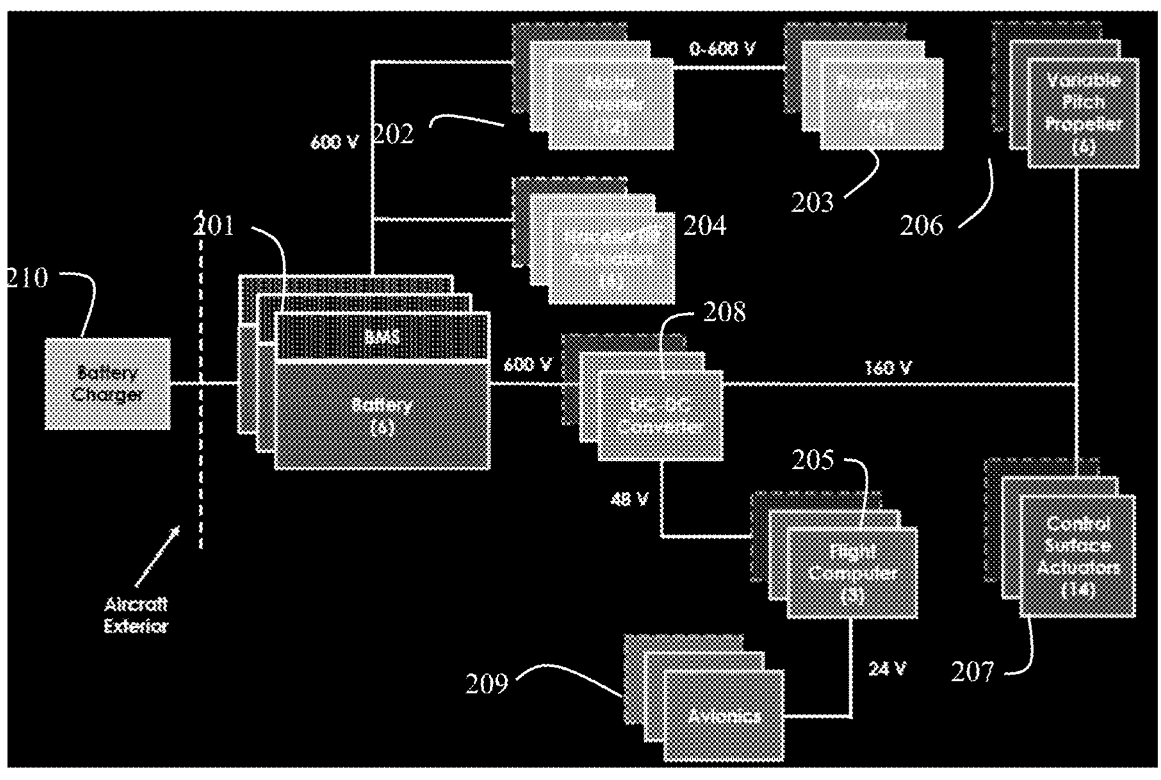
FIG. 12 illustrates a power system for an aircraft according to some embodiments of the present invention.

FIG. 12 is an illustrative embodiment of the electrical system power architecture for a six motor six battery aircraft. Each of the six batteries 201 supplies two power inverters, for a total of 12 power inverters 202. The nominal voltage of the batteries is 600V. Each of the six propulsion motors 203 has two sets of windings, with each motor powered by two inverters, one for each set of windings, although other configurations are envisioned. The two inverters powering a single motor each are supplied power by different batteries. In addition to supplying power to the motor inverters, the battery also supplies power to the rotor deployment mechanisms 204 (nacelle tilt actuators) which are used to deploy and stow the rotors during various flight modes (vertical take-off and landing configuration, forward flight configuration, and transition between).

A flight computer 205 monitors the current from each of the twelve motor inverters 202 which are supplying power to the twelve winding sets in the six motors 203. The flight computer 205 may also control the motor current supplied to each of the 12 sets of windings of the six motors. In some embodiments, the batteries 201 also supply power to the blade pitch motors and position encoders of the variable pitch propellers 206. The batteries also supply power to control surface actuators 207 used to position various control surfaces on the airplane. The blade pitch motors and the control surface actuators 207 may receive power run through a DC-DC converter 208, stepping the voltage down from 600V to 160V, for example. In some aspects, there may not be DC-DC converters. A suite of avionics 209 may also be coupled to the flight computer. A battery charger 210 may be used to recharge the batteries 201, and the battery charger may be external to the aircraft and ground based.

Figure 13:
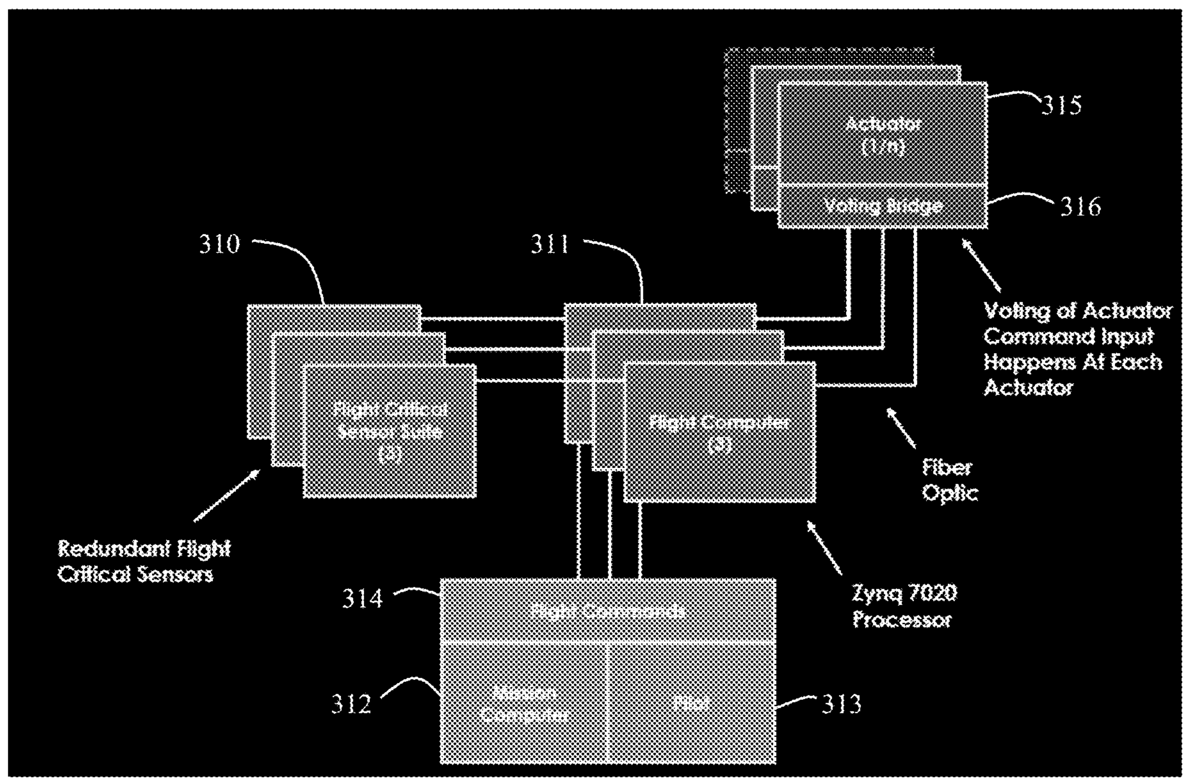
FIG. 13 illustrates a control system architecture for an aircraft according to some embodiments of the present invention.

FIG. 13 illustrates a flight control system architecture for a electric powered aircraft according to some embodiments of the present invention. In an exemplary embodiment, the flight computer 311 of the control system receives flight commands 314 from the mission computer 312 and from the pilot 313. The flight computer may also receive inputs from a flight critical sensor suite 310. The flight critical sensors may be triply redundant. The flight computer may be triply redundant. The system may include a voting bridge 316 on each actuator 315.

In some aspects, the flight computer 311 may include functionalities which monitor aircraft status with regard to parameters recited herein, and which may determine that a deep discharge condition exists, or that such a condition may exist later in the flight. In some aspects, the flight computer 311 may include functionalities for determining a landing approach mode, for determining a descent trajectory, for preparing the battery for flare control, for controlling the vehicle descent rate, and for arresting vehicle motion.

In variants, the method can be implemented in conjunction with the electric aircraft configuration described in U.S. application Ser. No. 16/409,653, filed 10 May 2019, which is incorporated in its entirety by this reference.

The term "rotor" as utilized herein, in relation to portions of the system 100 or otherwise, can refer to a rotor, a propeller, and/or any other suitable rotary aerodynamic actuator. While a rotor can refer to a rotary aerodynamic actuator that makes use of an articulated or semi-rigid hub (e.g., wherein the connection of the blades to the hub can be articulated, flexible, rigid, and/or otherwise connected), and a propeller can refer to a rotary aerodynamic actuator that makes use of a rigid hub (e.g., wherein the connection of the blades to the hub can be articulated, flexible, rigid, and/or otherwise connected), no such distinction is explicit or implied when used herein, and the usage of "rotor" can refer to either configuration, and any other suitable configuration of articulated or rigid blades, and/or any other suitable configuration of blade connections to a central member or hub. Likewise, the usage of "propeller" can refer to either configuration, and any other suitable configuration of articulated or rigid blades, and/or any other suitable configuration of blade connections to a central member or hub. Accordingly, the tiltrotor aircraft can be referred to as a tilt-propeller aircraft, a tilt-prop aircraft, and/or otherwise suitably referred to or described.

The term "substantially" as utilized herein can mean: exactly, approximately, within a predetermined threshold (e.g., within 1%, within 5%, within 10%, etc.), within a predetermined tolerance, and/or have any other suitable meaning.

Variations of the technology can afford several benefits and/or advantages. First, variations of this technology can arrest unpowered electric aircraft descent using existing flight components. Inventors have discovered that fully depleted secondary batteries (e.g., rechargeable batteries, such as lithium chemistry batteries) can provide short, high-power bursts of energy, although doing so may result in reduced battery lifetime and/or battery destruction. The inventors have leveraged this discovery by using the fully- or nearly-depleted secondary batteries (previously used to power rotors and/or propellers during flight) to provide a high-power burst of energy to arrest or slow unpowered aircraft descent in emergency conditions (e.g., a crash). Furthermore, the system can ensure sufficient time to "prime" the secondary batteries (hereinafter interchangeable with "batteries") for this burst by selectively ceasing battery power provision during flight when an emergency condition is detected, or by regeneratively charging the batteries during unpowered descent.

Figure 6:
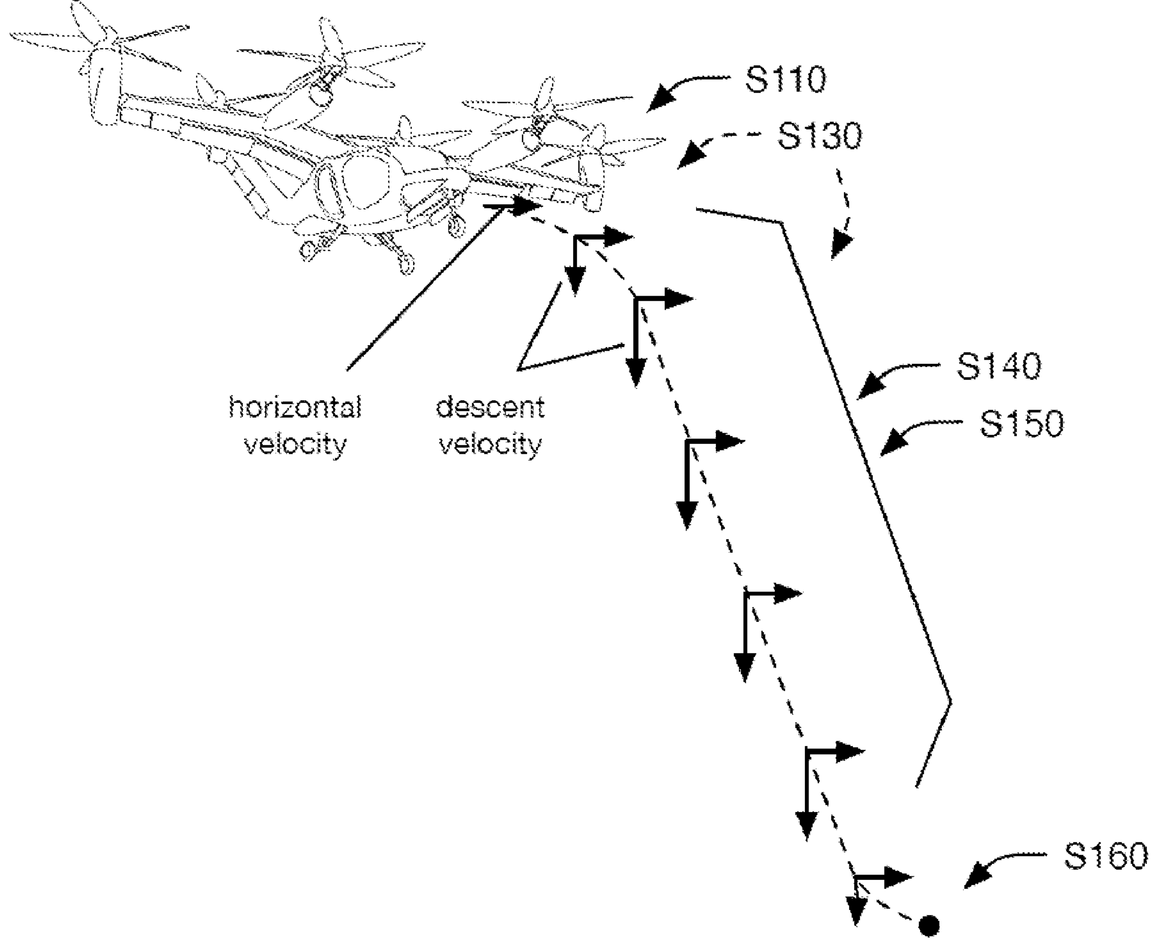
FIG. 6 is a schematic representation of an example of the method S100.

Second, variations of this technology can increase vehicle safety by mitigating 'no fuel' and/or 'no charge' scenarios by enabling autorotation of an aircraft with low rotational inertia (or low rotational kinetic energy) rotor blades. Such variants can regeneratively recuperate energy from the rotors during descent and use this recuperated energy to propel the aircraft during an arresting 'flare' in proximity to the ground. Variants can similarly utilize rotor blades to control the descent rate of the aircraft so that the aircraft does not become uncontrollable and/or overspeed (e.g., aircraft cannot be adequately arrested before impact/landing). During controlled descent, variants can prime and/or condition the batteries to ensure maximum thrust is available to arrest momentum during the arresting 'flare' (an example is shown in FIG. 6). In variants, priming the batteries can leverage a capacitive effect of batteries which allows them to supply greater instantaneous power supply when they have not been supplying power over a preceding time period (or conversely, avoid operating the batteries at reduced power during flare control by the same capacitive effect). Variants can additionally leverage thrust vectoring to arrest momentum, which can provide greater control authority than would otherwise be achievable with conventional autorotation landings. Variants employing thrust vectoring during 'flare' control can exhibit more precise and/or reliable landings than are achievable with conventional autorotation, and/or can enable landing with substantially zero horizontal velocity. In variants, thrust vectoring during 'flare' control can be partially or fully automated, which can reduce the cognitive load on pilots during stressful and/or safety critical landing scenarios (such as an emergency landing).

Third, by mitigating risks associated with 'no fuel' or 'no charge' scenarios, variations of the technology can increase the effective vehicle range (for a given battery), since batteries achieve the same degree of safety and/or landing performance for greater charge depths. Likewise, variants can achieve the same usable vehicle range as conventional electric aircraft with a smaller battery, since such variants can land without relying on a large overhead charge. Accordingly, variations of the technology can increase effective vehicle performance (by extending the usable range) and/or reduce the mass and cost associate with the battery. However, variations of the technology can additionally or alternately provide any other suitable benefits and/or advantages The method S100 can include: determining satisfaction of a deep discharge condition S110, preparing the battery for flare control S140, controlling the vehicle descent rate S150, and arresting vehicle motion S160. The method can optionally include: determining a landing approach mode S120 and determining a descent trajectory S130. Preparing the battery for flare control can include: priming (or idling) the battery, regenerating energy, and thermally conditioning the batteries. However, the method S100 can additionally or alternatively include any other suitable elements. An example of the method S100 is shown in FIG. 1.

Determining satisfaction of a deep discharge condition S120 functions to determine that the battery is nearing or has reached full discharge. Additionally or alternately, determining satisfaction of a deep discharge condition can function to determine that the battery can no longer continue to supply enough power to the rotors to sustain flight (e.g., at full power, at a reduced power level). Additionally or alternately, determining satisfaction of a deep discharge condition can function to initiate the landing sequence and/or notify a pilot (who can in turn initiate the landing sequence). Preferably, the battery management system (BMS) and/or onboard processor can individually or cooperatively determine satisfaction of the deep discharge condition based on the current (or estimated vehicle state), however the deep discharge system can otherwise be determined by any suitable set of vehicle components, and/or manually determined (e.g., by a pilot monitoring a fuel gage or charge indicator). The deep discharge condition can be met for the system if the deep discharge condition is satisfied for: one battery, predetermined percentage of batteries connected to an individual flight component, predetermined percentage of batteries onboard the aircraft (e.g., all batteries), and/or otherwise suitably satisfied. Deep discharge condition satisfaction can be determined based on: observed states, predicted states, and/or other data.

In S120, the BMS preferably monitors energy system conditions, such as: power, current, voltage, cell temperature, pack temperature, coolant flow rate, and/or any other suitable parameters. BMS monitoring can occur via continuous and/or discrete measurement of various sensors, such as: temperature probes, flow rate sensors, current sensors, cell/pack voltage (min, max, average), and/or any other suitable set of sensors. Based on these measurements, the BMS can determine: battery state of charge (SoC), depth of discharge (DoD), rate of discharge (present, maximum, expected, etc.), state of health (SoH), state of power (SoP), state of service (SoS), and/or any other suitable battery conditions and/or metrics. However, the BMS can otherwise suitably monitor battery conditions and/or determine any other suitable battery information/metrics. In some aspects, the above-referenced measurements may be used to calculate to an estimated hover time, which is the amount of time in hover mode—which requires a higher amount of power—available in the energy system.

In S120, the onboard processor preferably monitors vehicle state parameters and/or vehicle state sensors. Sensors and/or inputs to the onboard processor can include: altimeters, AGL sensors, GPS/GNSS, air data, propeller models, IMUs, and/or any other suitable sensors/inputs. However, the onboard processor can otherwise suitably monitor sensors, vehicle state, and/or related data.

The deep discharge condition is preferably a threshold, but can additionally or alternatively be a vehicle state, set of battery parameters, or another condition. The condition or threshold can be predetermined (e.g., fixed parameter value, lookup table, etc.) or can be dynamically determined (e.g., based on a battery model and/or vehicle model). The threshold can be calculated based on a single parameter (e.g., SoC) and/or combination of parameters, such as: state of charge, remaining range, sustained flight time remaining, battery temperature, altitude, velocity (vertical and/or horizontal components), flight mode (e.g., hover), and/or any other suitable parameters. In some variants, the aircraft can operate one or more flight components and/or battery at reduced capacity when at low SoC (and/or high DoD) and/or load balance across multiple batteries (e.g., packs, cells, etc.) such that all batteries simultaneously satisfy the condition and/or meet the threshold at the same initial time.

In a first variant, satisfying the threshold preferably establishes that the batteries will be unable to supply power continuously throughout the current flight plan, to the ground in the current flight mode, and/or throughout a conventional landing sequence (transition to hover to the ground), for example if it is determined that there is no significant hover time left. In a specific example, the battery is at a low state of charge and will reach substantially zero SoC (or otherwise be unable to sufficient power to the rotors to sustain flight) during a conventional landing. In such cases, it can be preferable to initiate the imminent landing sequence before reaching substantially zero SoC, as additional altitude, battery charge, and/or 'priming' time can improve performance and control authority during the landing flare. In a second specific example, it can be undesirable to reach substantially zero SoC within a regime of the altitude/velocity curve, where it can be difficult to adequately prime the batteries for flare control (e.g., such as when the vehicle is stationary 50 m above the ground or when vehicle velocity is 5 m/s in the direction of gravity while 20 m above the ground).

In a second variant, satisfying the threshold indicates that the battery can no longer provide sufficient power to the propulsion systems (rotors) to sustain flight. In a specific example, the threshold is satisfied if the battery supplies less than a predetermined percentage (e.g., 75%) of commanded/requested power.

In a third variant, the deep discharge condition (and/or threshold) is manually determined by pilot or pilot input (e.g., based on information available on a display, such as battery state or charge).

The deep discharge condition can be satisfied based on the present flight mode, or can be determined independent of flight mode. In a specific example, the deep discharge condition is only satisfied (and/or only activates the landing sequence) during hover and/or transition flight modes. An option in a circumstance wherein the energy system can deliver sufficient power for forward flight, but has no significant hover time available, may be to land the aircraft in a regular forward flight mode, if a landing site is available.

The method can optionally include determining a landing approach mode S120, which functions to determine the type of landing approach for a multi-modal aircraft. S120 can be employed for aircrafts configured to perform: autorotation, vertical landing, VTOL, STOL, operable between a hover mode and a forward flight mode, vehicles able to glide, and/or other suitable aircraft. Preferably, S120 occurs in response to satisfaction of the deep discharge condition, however can alternately occur in response to a manual (pilot) input, and/or occur with any other suitable timing.

In a first variant, the vehicle can transition from a hover mode to a horizontal glide control landing approach—which can increase range, enable access to different landing sites, and/or provide other suitable advantage.

Figure 9:
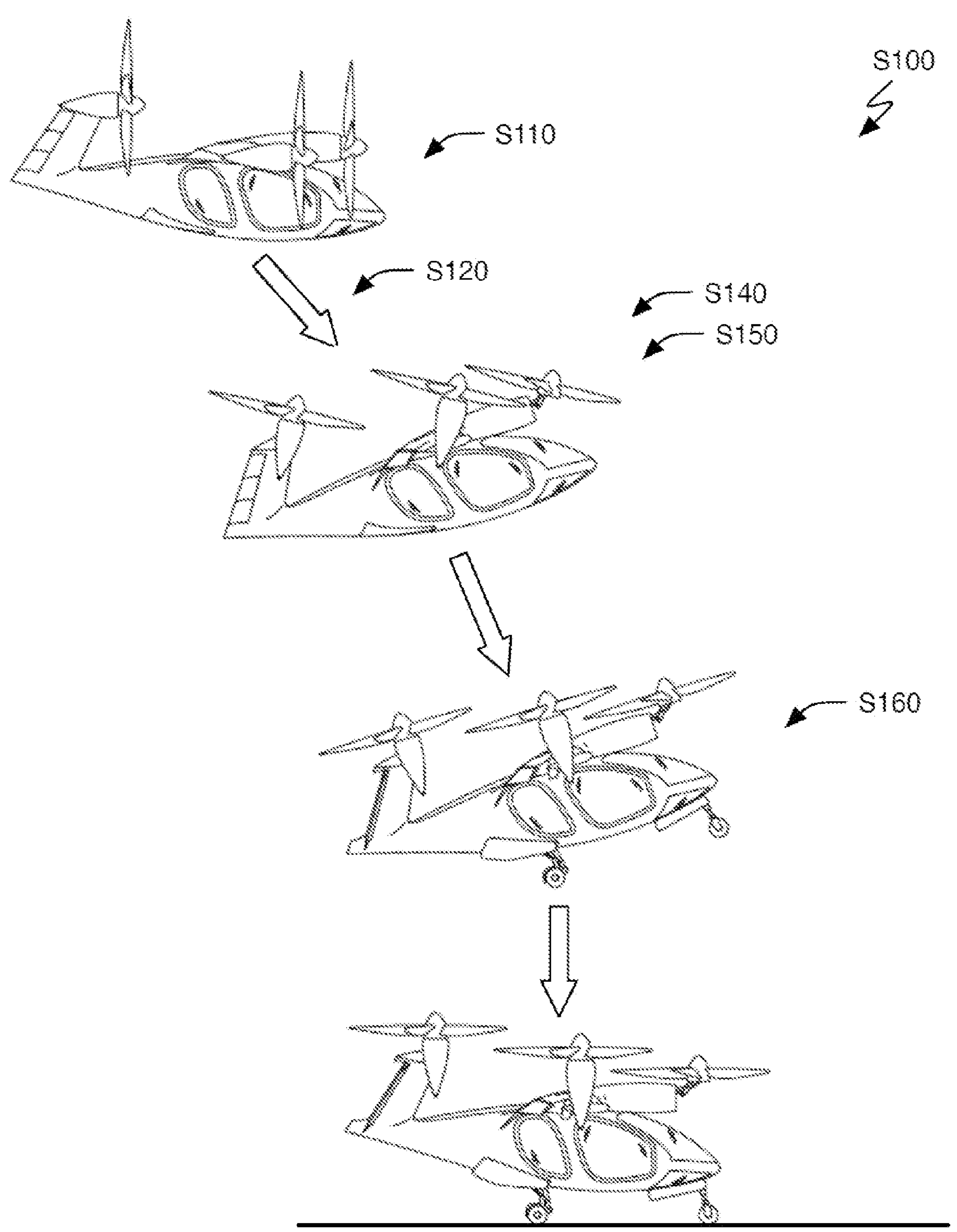
FIG. 9 is a schematic representation of an example of the method S100.

In a second variant, the vehicle can transition from a forward flight mode to a vertical landing approach mode (an example is shown in FIG. 9). Determining a vertical landing approach mode can be determined based on a terrain condition (e.g., tree-cover, terrain gradient above a threshold, forest, mountainous terrain, ice/snow ground cover, presence of hazards/obstacles, etc.), a weather condition (e.g., wind speeds above a threshold, precipitation, etc.), visibility condition (e.g., clouds, fog, visibility below a threshold, etc.), and/or any other suitable factors. In such instances, it can be desirable to have increased control authority (e.g., flare control) closer to the ground, which can enable more precise/accurate landings within a smaller geographic region and/or with less horizontal translation during landing.

The landing approach mode is preferably automatically determined (e.g., based on the vehicle state and/or onboard sensing. Automatic landing approach determinations can include use of a vehicle model, training/historical data, lookup tables, and/or any other suitable techniques. In a first specific example, hover mode maps to a vertical landing. In a second specific example, forward mode maps to a glide landing. In a third specific example, the landing approach mode is determined based on the horizontal velocity of the vehicle (e.g., horizontal velocity below a threshold maps to a vertical landing). Alternately, the landing approach mode can be manually determined (e.g., by a pilot or a remote operator)—such as in response to an alert. Alternately, the landing approach mode is not determined (e.g., for aircrafts capable of only a single approach mode, where a single landing approach mode is strictly preferable, etc.). However, the landing approach mode can be otherwise suitably determined.

The method can optionally include determining a descent trajectory S130, which functions to determine a landing path for the aircraft (an example is shown in FIG. 6). S130 can be determined based on the current vehicle state (e.g., forward and vertical velocity, control surface positions, altitude, global aircraft position, etc.), environmental conditions (e.g., wind direction, ambient temperature, cooling), a landing site location, estimated arrest parameters (velocity, height, time), estimated landing runway length, minimum descent rate (e.g., before rotors stall), optimized propeller regeneration efficiency, passenger comfort, battery performance, and/or any other suitable parameters. S130 can occur with any suitable timing during the method. S130 can occur once, repeatedly, prior to aircraft descent, concurrently with aircraft descent, before ceasing a power provision from the batteries, after ceasing a power provision from the batteries, in response to S120, before and/or during S140, before and/or during S110, and/or with any other suitable timing during the landing. In a specific variant, with a predetermined amount of power remaining in the battery, a trajectory is determined and the remaining power is used to set the aircraft on the trajectory prior to ceasing a power provision to the battery.

S130 can optionally include determining a landing site, which functions to ensure the aircraft can safely land upon motion arrest. The landing site can be determined based on terrain characteristics, available space, runway length (and/or landing pad area), and/or any other suitable landing site characteristics. The landing site can be determined automatically or manually, such as by a user selection, a determination from a pre-existing database (e.g., known helipads within the geographic region), with computer vision techniques, and/or otherwise suitably determined. The landing site can be selected before, in response to, or after satisfaction of the deep discharge condition. Preferably, landing sites are continuously and/or constantly evaluated, and accordingly the landing site can be selected and/or updated/refined with any suitable timing. The landing site can be selected concurrently with preparing the battery for flare control S140, but can alternately occur after.

In a first variant where the landing site is selected after S140, the user/pilot has full control authority to land during flare control and/or vehicle arrest. In a second variant where the landing site is selected after S140, the pilot has full control authority after vehicle momentum is arrested and stationary (hovering) above the ground.

S130 can include a single landing site determination, or the landing site can be repeatedly determined and/or dynamically updated during flight and/or descent (e.g., continuously, discretely, periodically, etc.; such as refining a landing site to a smaller geographic region, etc.). S130 can additionally or alternately include controlling the aircraft to the landing site, which can occur automatically (e.g., autonomously via onboard processing and/or navigation, autopilot) and/or manually. Manual control to the landing site can include augmentation or pilot assistance, which indicate a trajectory to the pilot, or can automatically optimize aircraft parameters (e.g., control surface positions, propeller regeneration maneuvers, etc.) for a pilot-specified landing site or trajectory. However, a descent trajectory and/or landing site can be otherwise suitably determined.

The method can include preparing the battery for flare control S140, which functions to place the battery in condition to deliver a final 'burst' of power prior to touchdown. S140 preferably occurs in response to satisfaction of the deep discharge condition, however portions of S140 can occur during normal operation of the aircraft, before flight, after satisfaction of battery condition, and/or with any other suitable timing.

S140 preferably includes idling the battery S144, which functions to improve temporal battery power characteristics. Idling the battery preferably occurs when a power provision from the battery to the rotor(s) has ceased (e.g., no power flowing from batteries to the propulsion systems and/or rotors), and can include or exclude periods of regeneration (e.g., when energy is recuperated from the rotors). In some aspects, the forward velocity of the aircraft can be maintained while idling the battery in conjunction with a drop in altitude. Idling batteries can utilize a capacitive effect which allows a greater instantaneous power supply when the battery has not been supplying power over a preceding time period (1 second, 10 seconds, 30 seconds, 1 minute, etc.). In a specific example, the battery can subsequently utilize a greater depth of discharge (e.g., at a particular power provision) than under continuous power draw. In a second specific example, battery idling occurs simultaneously with regeneration, wherein a maximum regeneration power is less than a threshold percentage of the continuous (or maximum) power provision from the batteries to the rotors during normal operation.

S140 can optionally include regenerating energy S146, which functions to increase the state of charge of the battery during descent, and can additionally or alternately function to convert potential energy associated with the altitude of the aircraft into a different form of stored energy (e.g., chemical energy, mechanical energy, electrical energy). In variants, regenerating energy can additionally convert a portion of the kinetic energy of aircraft (e.g., translational, rotational) into a different form of stored energy. Regenerating energy can include operating electric motors as an electric generator, removing rotational kinetic energy from the rotors (rotating about the rotor axis) and producing an electrical current which can be stored at the battery, thereby increasing the state of charge of the battery. In particular, where the effect of air flowing up through the rotors during descent would otherwise increase the rotor RPM (and associated rotational kinetic energy and rotational inertia of the rotors), regeneration can occur at substantially uniform rotor RPM. Similarly, increasing/decreasing regeneration (e.g., in conjunction with modifying other control parameters) can accordingly modify/control the RPM of the rotors, which can control the rotor RPM such that it remains positive (e.g., in the direction of rotation during normal operation, without stalling), increases, decreases, and/or has any other suitable value during aircraft descent and/or S140. Accordingly, by allowing RPM control, regenerating energy can enable control authority over individual rotors and/or the aircraft during descent.

In variants, stalling the rotor can be undesirable, as it can limit control authority and regeneration potential during descent. In variants, maintaining a substantially uniform RPM with continuous (and/or uniform) regeneration can maximize energy recovery during descent.

S146 can be effective when employed with variable pitch rotors, enabling dynamic optimization of regeneration for various flight conditions/characteristics and/or current vehicle state parameters. However, regeneration can alternately be employed with fixed pitch rotors (which cannot be dynamically adjusted during flight), tiltable rotors, and/or any other suitable rotors.

In particular, S146 can be optimized with a specific relationship between the rotor RPM, descent rate (including vertical and/or horizontal components), and/or blade pitch angle. The relationship of these parameters can be determined: empirically (e.g., based on a lookup table, based on testing data, etc.), analytically (e.g., based on CFD models, based on a propeller model), and/or otherwise suitably determined. The aircraft can be automatically controlled at this optimal relationship (e.g., control individual rotors based on the optimization and/or control distribution of rotors based on the optimization) or can assist the pilot in achieving an optimized regeneration trajectory while suitably enabling control towards a landing site.

Regenerated electrical energy (e.g., charge) from S146 can be provided to the batteries in any suitable manner. Preferably, regenerated electrical energy is evenly distributed between the batteries. However, regenerated electrical energy can alternately be unevenly distributed between the batteries based on differences in thermal condition, SoC (e.g., suitably distributed based on a load balancing scheme), SoH (e.g., inoperable batteries are not provided a power provision), SoP, SoS, and/or any other suitable characteristics. Alternately, regenerated electrical energy can otherwise be suitably distributed between batteries such that greater power (e.g., maximum instantaneous power) will be available for vehicle arrest and/or flare control.

Figure 16A:
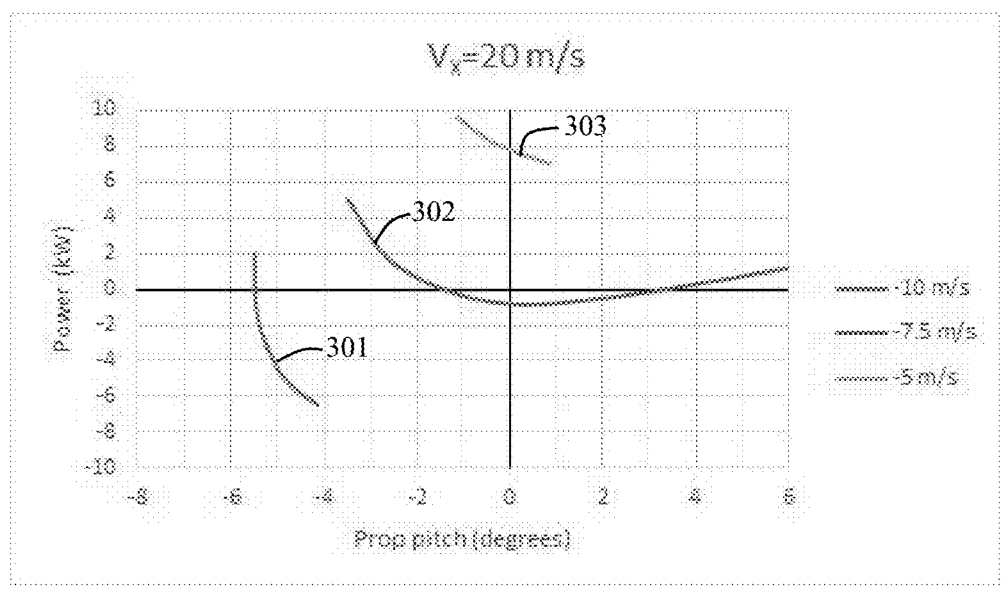
FIG. 16A illustrates a relationship between recuperated power and descent rate according to some embodiments of the present invention.
Figure 16B:
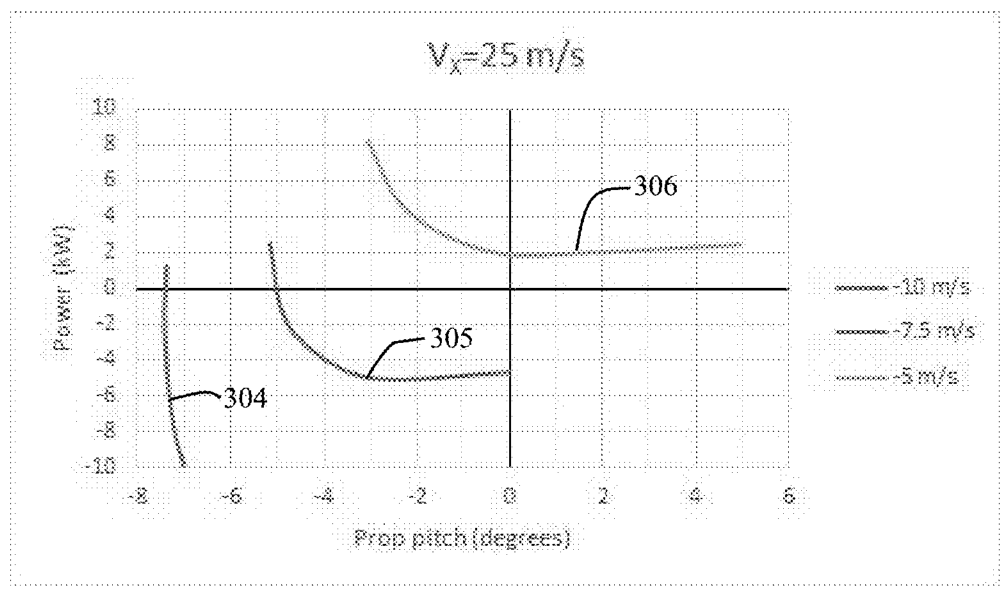
FIG. 16B illustrates a relationship between recuperated power and descent rate according to some embodiments of the present invention.

FIGS. 16A and 16B illustrate the power that can be regenerated S146 for different forward velocities in conjunction with different descent rates according to some embodiments of the present invention. FIG. 16A illustrates the power vs. propeller pitch angle with 20 m/s forward aircraft speed for varying descent rates: −10 m/s 301, −7.5 m/s 302, and −5 m/s 303. Using the −10 m/s curve 301 as an example, it can be seen that a range of power values can be either positive or negative. The positive power value of 2 kW at approximately −5.6 degrees blade pitch is illustrative of power being delivered to the motors from the batteries. In contrast, the negative power values beginning at approximately −5.5 degrees blade pitch range from 0 power to over −6 kW at −4 degrees propeller blade pitch, with the negative power number indicating that power is being delivered to the system from the rotors. FIG. 16 B similarly illustrates the power vs. propeller pitch angle with 25 m/s forward aircraft speed for varying descent rates: −10 m/s 304, −7.5 m/s 305, and −5 m/s 306.

Using the −7.5 m/s descent rate curve 305 as an example, it can be seen that −5 kW is generated over a range of blade pitch angles. This power delivery is per rotor, so with a six rotor system 30 kW can be delivered. An example of required flare power is 400 kW for 5-10 seconds for the entire 6 rotor aircraft. With recovery at 30 kW, it would take 13.3 seconds of recuperation at this rate for each second of flare power needed. For a 10 second flare it may take a drop of 997.5 meters to achieve this recuperation, excluding inefficiencies. However, at a descent rate of 10 m/s 304 a much higher recovery may be achieved, at 10 kW per rotor, or 60 kW per aircraft. For a 10 second flare, it would take half of the time at this recuperative rate, or 6.6 seconds. The aircraft may descend 660 meters during this recuperation period. In some aspects, the flare may be for a shorter time, such as 5 seconds. A 5 second flare may consume 2 MJ. Depending upon the altitude drop available during the descent, and the power needed to be recuperated in order to support a flare (which may vary upon the state of discharge of the batteries), the forward speed desired (which may coupled to the distance to the desired landing location and other factors), and other factors mentioned herein, the descent rate and blade pitch may be selected in order to recover energy for the flare operation. As may be seen, a quicker descent rate is more efficient in terms of energy capture, however it may present less time, and less distance traveled for a given forward velocity, to achieve a selected landing zone.

Figure 15:
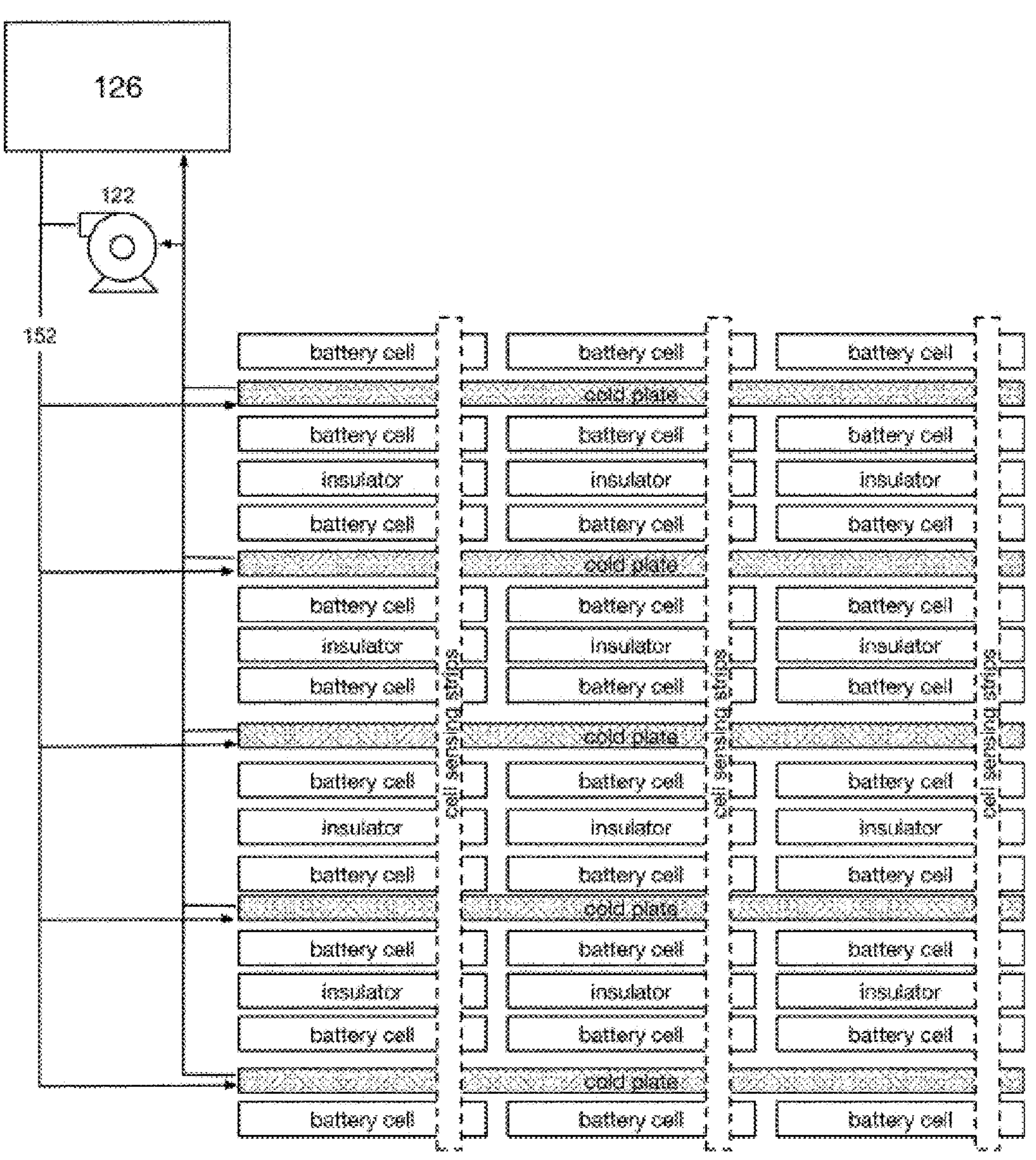
FIG. 15 illustrates a battery thermal control system according to some embodiments of the present invention.

S140 can optionally include thermally conditioning the batteries S142, which functions to thermally condition the battery to optimize for flare control performance. S140 can include circulating fluid through and/or cooling the batteries, reducing and/or ceasing power supply to thermal management systems (e.g., to preserve energy for flare control). S142 can include: increasing battery cell temperatures, decreasing battery cell temperatures, substantially maintaining cell temperatures, redistributing heat from one battery cell to another, shifting a battery temperature towards a predetermined temperature range (e.g., maximum power output range), and/or any other suitable battery thermal conditioning. In a specific example, the battery conditioning is substantially as described in U.S. application Ser. No. 16/857,003, filed 23 Apr. 2020, which is incorporated in its entirety by this reference. In some aspects, the starting temperature of the batteries may be 30° C. An exemplary thermal conditioning may be to increase the battery temperature by 10-20° C. In some aspects, the battery temperature may be raised by 5° C., as there may not be sufficient time to raise the temperature higher. In some aspects, the battery temperatures are maintained such they do not lose temperature prior to the flare operation. In some aspects, the battery temperatures are raised in the range of 5-10° C. In some aspects, the battery temperatures are raised in the range of 5-20° C. The battery thermal management system may include one or more battery packs, a circulation subsystem 152, and a heat exchange system. The circulation subsystem includes: a pump 122 and a fluid manifold, and can optionally include a hose coupling 126 and a lockout mechanism. The system 100 can optionally include a cooling system, a reservoir, a deionization filter, a battery charger, and a controller. The system can additionally or alternatively include any other suitable components. An example of the system is shown in FIG. 15.

The circulation subsystem of the battery thermal management system functions to increase temperature uniformity (e.g., among cells) within the battery pack. Increasing temperature uniformity can include reducing temperature disparity between disparate regions (e.g., cells) of the battery pack. In cases wherein the battery pack is at or near a uniform temperature, the circulation subsystem can also function to uniformly or nearly-uniformly adjust the temperature of the battery pack (e.g., to condition the battery pack temperature). The circulation subsystem can also function to circulate working fluid through and/or adjacent to the battery pack. The circulation subsystem can also function to store heat generated by the battery pack. The circulation subsystem can include the fluid envelope within which the working fluid is circulated, an onboard pump, a reservoir, a heat exchanger (e.g., onboard and/or offboard) and an offboard pump. The circulation system can be controlled to allow the batteries to heat up, such as by reducing any cooling flow through the batteries. In some aspects, the heat exchanger may be controlled to use the heated cabin air to provide heat to the heat exchanger.

The fluid envelope functions to house the working fluid as it circulates among components of the battery thermal management system. The envelope can include piping, tanks, valves, regulators, and/or any other suitable fluid handling components. For example, the envelope can include the fluid manifolds (e.g., distribution manifolds) and the cold plate volumes. The envelope can be made of any suitable material that can transfer heat between the working fluid and other components of the system (e.g., the heat exchanger, the battery pack, etc.) and/or the external environment (e.g., the airflow proximal the battery pack). The envelope can be thermally uninsulated, partially insulated (e.g., along a portion of the periphery), or insulated from the environment/ambient conditions. The envelope can be constructed of any suitable materials such as: metals, plastics, polymers, rigid materials, non-rigid materials, or any suitable combination thereof. The material of the envelope is preferably selected to correspond to the properties/requirements of the working fluid (e.g., to avoid corrosion or other deleterious interactions, avoid degradation in high and/or low temperature conditions, meet pressure requirements of circulation subsystem, minimize head loss in circulation subsystem, etc.), but can additionally or alternatively be selected with any suitable basis.

Figure 2:
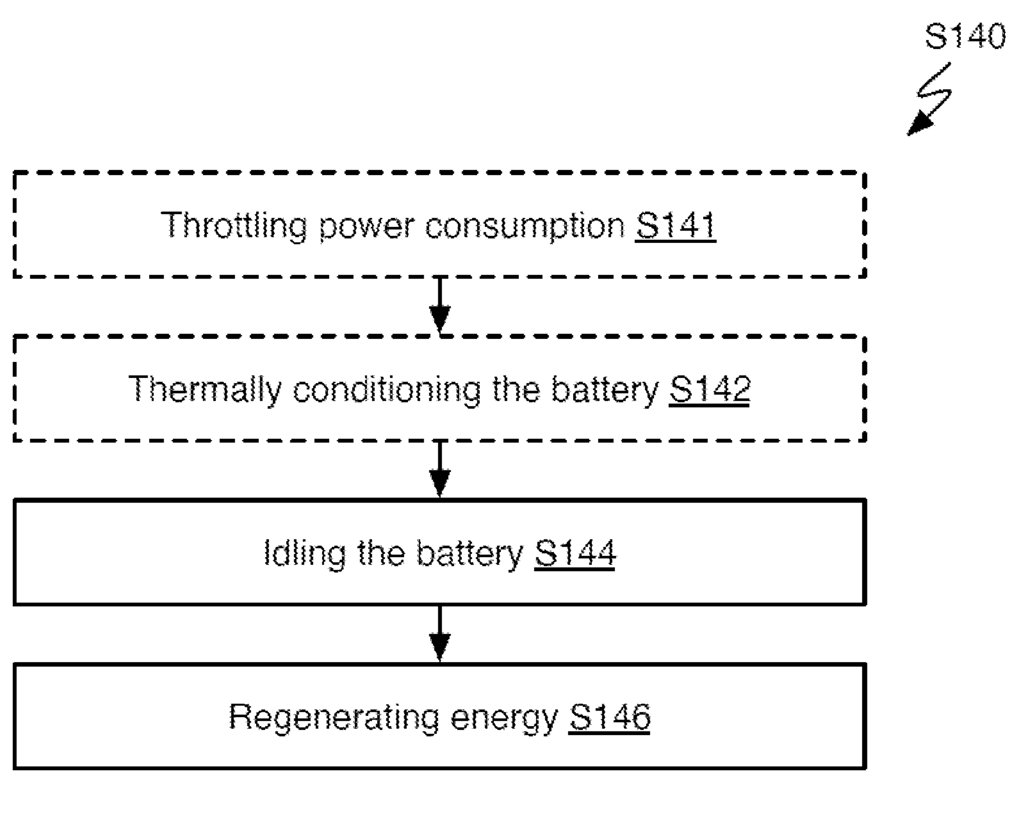
FIG. 2 is a diagrammatic representation of a variant of preparing the battery for flare control.

The circulation subsystem preferably includes an onboard pump, which functions to circulate working fluid through the battery pack (e.g., via the onboard heat exchanger, via a cold plate). The system preferably includes at least one onboard pump for each battery pack; accordingly, a plurality of battery packs is preferably associated with a corresponding plurality of onboard pumps. However, the system can include one pump for each set of two battery packs, and/or any other suitable number of onboard pumps. The onboard pump is preferably arranged within the vehicle, and connected to the envelope in parallel to an interface connection between the vehicle and the infrastructure installation as shown in FIG. 2. More preferably, the onboard pump is arranged proximal to one or more battery packs (examples are shown in FIGS. SA-B, 6A-B, and 7A-B), which can reduce the required mass/volume of working fluid and/or fluid manifold components required to fluidly connect the pump to the battery pack(s). The onboard pump can be integrated into a battery pack, separate from a battery pack, integrated into a reservoir, proximal to the hose coupling, and/or otherwise implemented. The onboard pump is preferably arranged between the battery packs it services (e.g., physically between; at an intermediate position along the fluid coolant circuit), but can alternatively be arranged to the side of the battery packs, in a separate vehicle component, or at any other suitable location.

The onboard pump can also function to circulate working fluid through the battery pack at a defined flow rate, wherein the defined flow rate is determined by an onboard pump controller. The onboard pump is preferably sized (e.g., physically sized, sized according to maximum pumping speed and power requirements, etc.) according to the volume of working fluid onboard the vehicle when the circulation subsystem is disconnected from the infrastructure installation (e.g., a smaller volume). For example, the onboard pump can be smaller, lighter, and/or less powerful than the offboard pump because the onboard pump is preferably not used to circulate the working fluid during conditioning (e.g., when the circulation subsystem is connected to the infrastructure installation and thus the heat exchanger). However, the onboard pump can additionally or alternatively be otherwise suitably sized.

The onboard pump is preferably connected to the envelope in parallel (examples are shown in FIG. 2 and FIG. 11A), such that the onboard pump can be held idle during conditioning by the combined battery thermal management system (e.g., wherein the vehicle is connected to the infrastructure installation including the heat exchanger). In examples, the onboard pump defines a pumping speed range that is matched to the volume of working fluid onboard the vehicle when the vehicle is detached from the infrastructure installation, and in cases wherein the vehicle is attached to the infrastructure installation for conditioning the onboard pump is not used, in favor of an offboard pump (e.g., sized or otherwise configured for the greater pumping requirements of the combined system and working fluid volume). In a first variant, the onboard pump is fluidly connected to two battery packs and is located between them (e.g., coplanar with the battery packs, arranged within the projection of the battery pack sides, etc.), thereby minimizing the length of tubing required. In a second variant, the onboard pump is located in a wing (e.g., two pumps-one located in each wing), which can ensure the fluid manifold does not infringe on cabin space. However, the onboard pump can be otherwise arranged.

S140 can optionally include throttling a power consumption S141, which functions to reduce a power provision from the battery to one or more power consuming components of the aircraft (e.g., operate the aircraft in a reduced power mode). Power consuming components can include: non-critical components (e.g., HVAC systems), flight critical components (e.g., actuators, propulsion systems, etc.). In a specific example, the aircraft can cease power to non-critical components and reduce power to flight critical components. Alternately, the aircraft can operate without throttling power consumption (e.g., before and/or after satisfaction of the deep discharge condition). An example of preparing the battery for flare control is shown in FIG. 2. However, the aircraft can otherwise suitably prepare the battery for flare control.

The method can optionally include controlling the vehicle descent rate S150, which functions to reduce the momentum of the aircraft to be arrested during flare control. S150 can additionally function to enable aircraft control along a descent trajectory and/or landing path (e.g., towards a landing site). Preferably, the descent rate is controlled concurrently with preparing the battery for flare control S140 and/or during aircraft descent. During controlled descent, the rotors continue rotating in the same direction as under normal operating conditions (e.g., even while contemporaneously regenerating electrical charge), with upflow (airflow up through the rotor blades) providing resistance to the downward force of gravity—thereby reducing downward acceleration of the aircraft (an example is shown in FIG. 10B). During portions of controlled descent, upflow providing resistance to the downward force of gravity can provide a source for energy recuperation, which can be recovered by regeneratively braking the rotors in S140. Likewise, controlling electrical regeneration during S140 can serve to regulate and/or control descent rate during S150 by changing the resistance of the aircraft to the effects of gravity (and accordingly controlling aircraft acceleration). Airflow through the individual rotor blades can be controlled via blade pitch adjustment, rotor RPM (e.g., which can be manipulated via variable regeneration of the rotor), rotor angle (relative to the direction of motion), and/or rotor cyclic. Rotors can be controlled collectively and/or individually. Individually controlling the rotors and/or controlling the distribution of airflow resistance across the rotors can generate resulting forces and/or moments on the aircraft body (e.g., generate pitch/yaw/roll control authority during descent). Accordingly, rotor control can be used during descent to direct the aircraft along a particular flight path toward a landing site. Additionally, conventional control surfaces (flaps, rudders, elevators, tail rotor, etc.) can be used in conjunction with rotor control to modify an orientation of the aircraft and/or flightpath during controlled descent.

S150 can additionally include maintaining a positive horizontal rate, which functions to improve aircraft control authority and preserve airflow characteristics through the rotors (e.g., and/or across flight control surfaces). In variants, maintaining a positive horizontal rate means that the vehicle will lose potential energy less rapidly as sink rate is minimized at a certain forward velocity. Accordingly, maintaining a positive horizontal rate can increase vehicle range (providing additional landing site opportunities), increase the time to prepare the battery for flare control, and/or improve airflow characteristics. The during descent, the horizontal rate can be maintained at an optimal value (minimizing sink rate) such that it initially increases, decreases, remains constant, modulates (e.g., to optimize regeneration), and/or can be otherwise suitably maintained. In particular, a positive horizontal rate during descent can avoid a vortex ring state and/or minimize vortex ring generation, which would otherwise reduce the aerodynamic resistance of the spinning rotors to the effects of gravity. Further, positive horizontal rate can improve pilot visibility towards the landing site (e.g., aircraft can have poor line of sight directly beneath the aircraft). The positive horizontal rate can be optimized for a particular aircraft, landing scenario (e.g., altitude-velocity curve), and/or trajectory towards a landing site. The horizontal control rate is primarily controlled by pitching the aircraft and/or adjusting a rotor plane pitch (e.g., via a tilt mechanism) to control the angle of the rotors (e.g., relative to the direction of aircraft motion, relative to the direction of a gravity vector, etc.), thereby generating lift and/or drag from wings and/or rotors to control horizontal rate (e.g., relative to vertical rate). Alternately, horizontal rate can be controlled by modifying the distribution of rotor power (and/or regeneration). Aspects of the power regeneration and descent rates are also discussed above with regard to FIGS. 16A and 16B.

In variants employed on a tilt-rotor aircraft with a fixed wing, the angle of attack of the rotors can be adjusted (e.g., to a predetermined angle, dynamically, manually, etc.) independently relative to the wing. Accordingly, the wing pitch and the rotor plane pitch (e.g., normal to the rotor axis) can be independently optimized for descent rate, horizontal rate, and maximum regeneration (e.g., in S146).

In variants, there can be a tradeoff between the desired blade pitch angle (and/or RPM) corresponding to maximum regeneration efficiency in S146 can and the desired blade pitch angle (and/or RPM) which will minimize the descent rate. Accordingly, in such cases the blade angle can be selected as a weighted average of the two optimal values, selected to maximize flare control authority (e.g., based on available power after marginal momentum increase has been arrested during flare control), determined based on an optimization calculation, and/or otherwise suitably determined respect these conflicting parameters.

Figure 7:
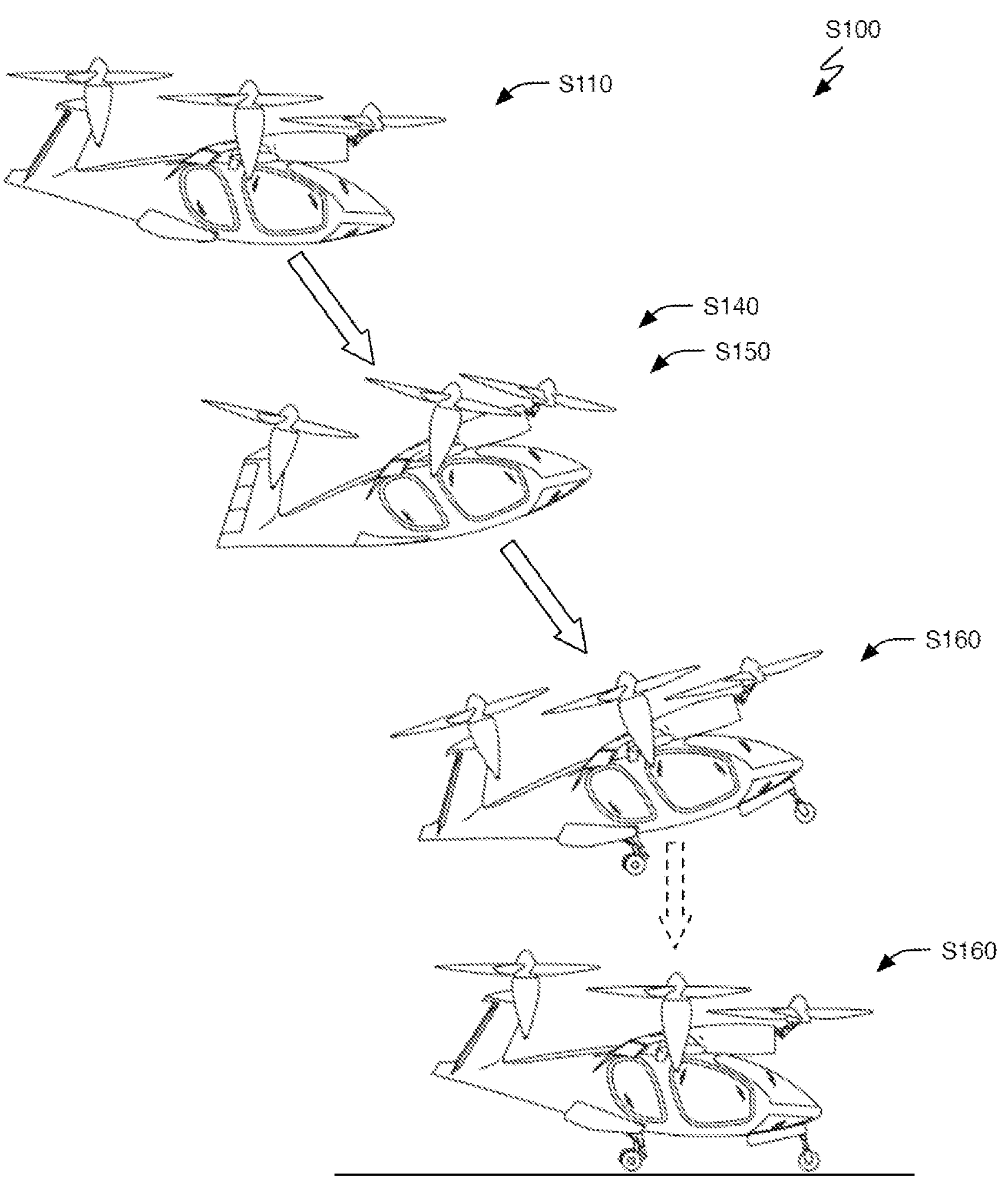
FIG. 7 is a schematic representation of an example of the method S100.
Figure 8:
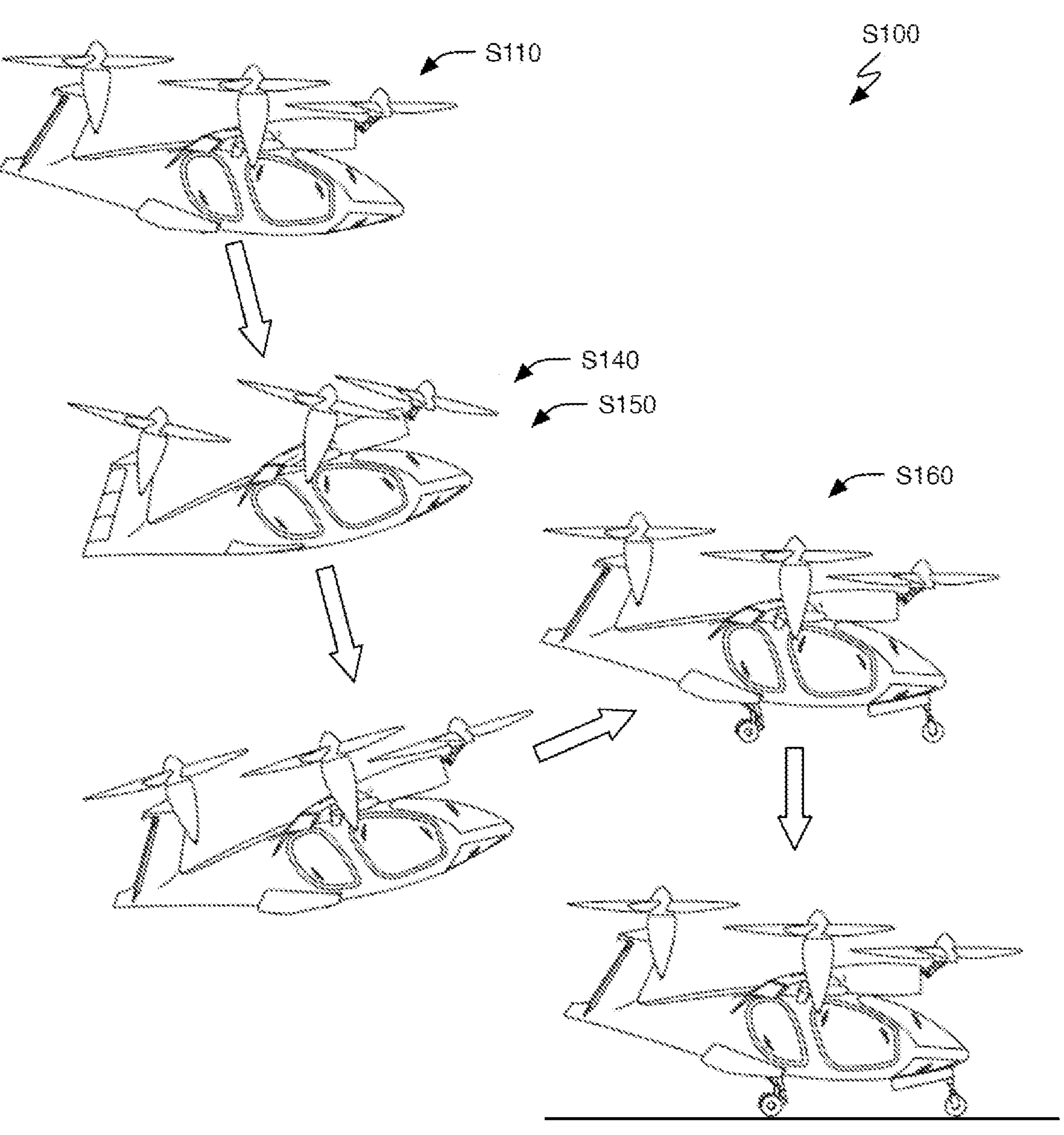
FIG. 8 is a schematic representation of an example of the method S100.
Figure 11:
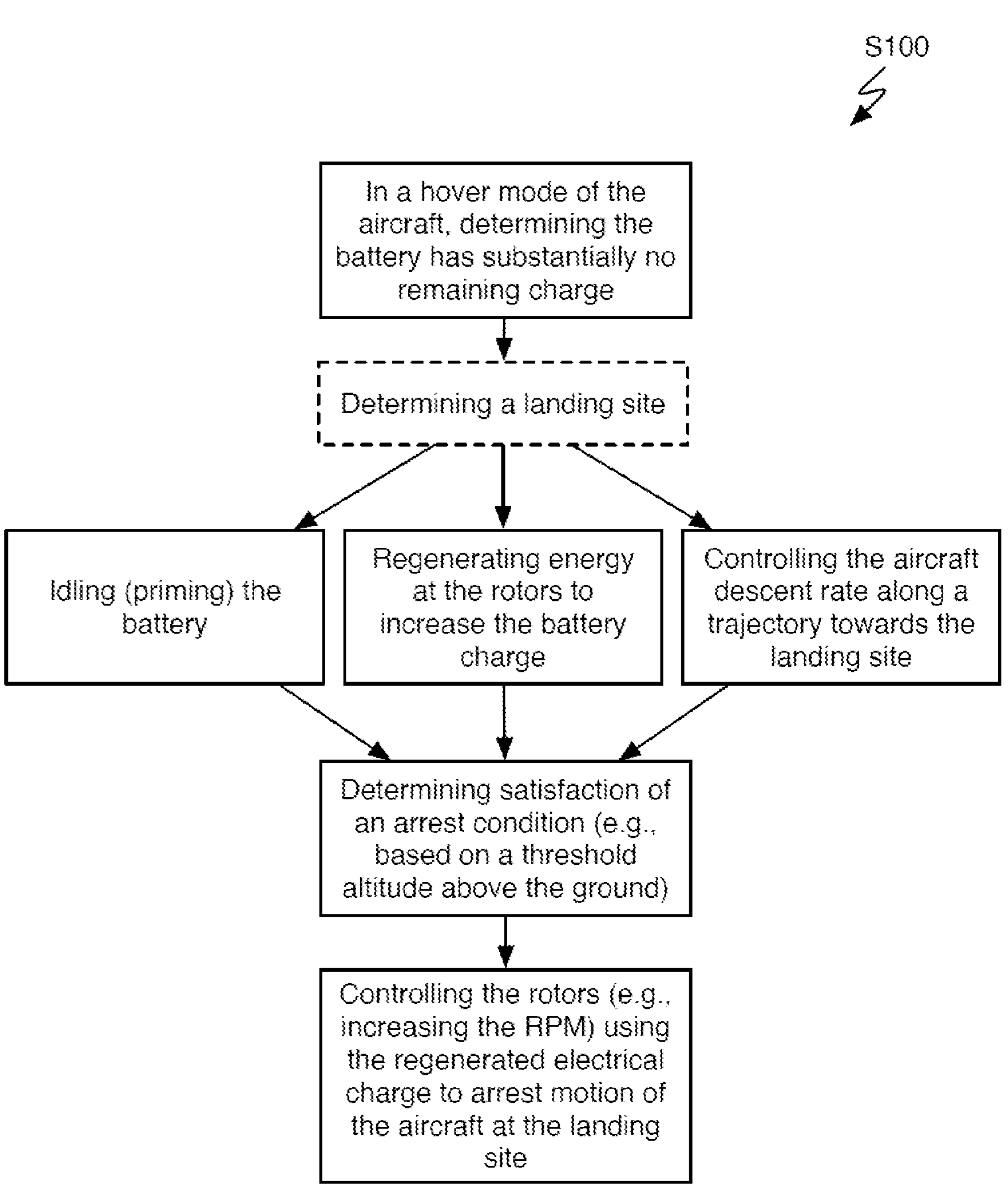
FIG. 11 is a diagrammatic representation of an example of the method S100.

The method can include arresting vehicle motion S160, which functions to reduce the descent rate (and momentum of the aircraft) prior to landing impact, along with the associated deceleration impulse. Additionally or alternately, S160 can function to enable control authority to the pilot for a period of time to navigate various terrain/landing conditions (an example is shown in FIG. 8). S160 can additionally function to match required landing constraints of the landing site. S160 can arrest velocity and/or one or more velocity components (e.g., horizontal velocity component, vertical velocity component, lateral/spanwise velocity component, etc.) to substantially zero before and/or during landing (e.g., stationary hover/landing), can arrest velocity to within a velocity threshold (e.g., vertical rate threshold, horizontal rate threshold, net velocity threshold, speed threshold, etc.), and/or otherwise suitably arrest aircraft motion (an example is shown in FIG. 7). Preferably, S160 occurs in response to satisfaction of an arrest condition (an example is shown in FIG. 11). The arrest condition can include: an altitude above the ground, time to impact, a descent velocity exceeding a threshold, a user input. The arrest condition can be determined based on a maximum impact velocity, a battery power output (e.g., determined based on battery age, number of cycles, battery temperature, other battery operation parameters), and/or any other suitable factors. The arrest condition can be predetermined, calculated, selected, and/or otherwise suitably determined.

S160 can include determining a maximum instantaneous power of the battery S164, which functions to determine power constraints of the arresting 'flare.' The power constraints can be determined from a pre-generated lookup table, dynamically determined based on a battery model, determined based on testing data, component specifications, and/or otherwise suitably determined. The power constraints of the arresting flare can include power constraints of powerplants, propulsion systems, electrical components, which can be predetermined, determined in a single determination (e.g., prior to flare control, a maximum instantaneous power, a maximum continuous power over a time period—such as the flare duration, a power distribution maximized over a time period, etc.), repeatedly determined (e.g., continuously during flare/arrest), determined based on priming conditions—such as expected battery preparation time (e.g., time spend idle and/or slowly regenerating energy), expected SoC of flare control, and/or any other suitable characteristics. The maximum instantaneous power can additionally or alternately include a power profile (e.g., maximizing the amount of power delivered before arrest), which can deliver increasing, decreasing, and/or constant power across one or more portions of the arresting flare. However, the maximum instantaneous power can be otherwise suitably determined.

S160 can include discharging the batteries beyond the deep discharge limit (e.g., the deep discharge threshold; discharge limit during typical operation) to power flight components. In these variants, the BMS can be overridden, can switch to operating in an arrest mode, and/or otherwise managed.

S160 can include controlling the rotors at the maximum instantaneous power to arrest vertical rate S166, which functions to generate thrust to appropriately arrest the vehicle during a 'flare' of powered flight (examples are shown in FIG. 10A and FIG. 10C). S166 can occur with any suitable timing. S166 can occur automatically, such as: based on an altitude/velocity curve and the available energy, based on a predetermined sequence (e.g., selected by a user during S130, default sequence, etc.), based on autonomous vehicle control, and/or otherwise be automatically implemented. Alternately, S166 can occur in response to a user input and/or control request. However, the rotors can alternately be controlled below the maximum instantaneous power, operate during the arresting flare within a predetermined threshold difference of the maximum instantaneous power (or power profile maximizing power delivery), and/or can be otherwise suitably controlled to arrest vehicle motion.

In variants, S166 can provide pilots a predetermined period of flare control (e.g., full power hover and/or reduced power/control authority) with any suitable control laws. In a specific example, the control laws are substantially as described in U.S. application Ser. No. 16/708,367, filed 9 Dec. 2019, which is incorporated in its entirety by this reference.

Controlling the aircraft during flare control can include thrust vectoring, which functions to generate a net thrust vector such that the resulting acceleration of the aircraft will arrest the velocity (e.g., net, horizontal, vertical). Thrust vectoring can be controlled via adjustment of tilt mechanisms, controlling a thrust distribution across a plurality of rotor systems, and/or by adjusting individual/collective rotor control (e.g., power, RPM, blade pitch, cyclic, etc.). In particular, controlling the aircraft during S160 can include increasing the RPM and corresponding rotational inertia and/or rotational kinetic energy of rotors by supplying power to a propulsion system from a battery over a period of time. Preferably, the time period can include a time of initial ground contact, terminate at the time of initial ground contact, continue after initial ground contact, terminate prior to initial ground contact, and/or otherwise suitably operate. Alternately, the RPM and corresponding rotational inertia and/or rotational kinetic energy can be decreasing and/or substantially continuous over the time period. In a first variant, the aircraft can arrest both horizontal and translational velocity during S160.

In a second variant, the aircraft can arrest only translational velocity during S160, with any suitable horizontal velocity (e.g., substantially constant, increasing, and/or decreasing horizontal velocity).

Figure 3:
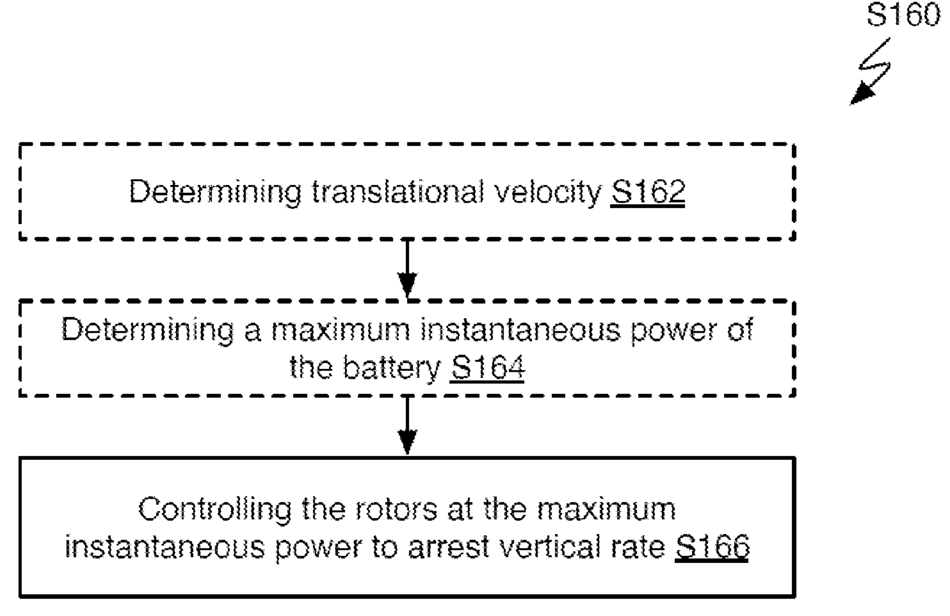
FIG. 3 is a diagrammatic representation of a variant of arresting vehicle motion.

An example of arresting vehicle motion is shown in FIG. 3. However, the aircraft can otherwise suitably arrest vehicle motion.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A method for landing an electrically powered tiltrotor aircraft in a deep discharge battery condition said tiltrotor aircraft comprising rotors and a battery or batteries, said method comprising the steps of:

determining a landing approach mode, wherein said landing approach mode is a vertical landing approach mode;

determining a descent trajectory;

beginning a descent with rotors in a hover configuration, said rotors having a front side and a back side opposite said front side, wherein said front side of said rotors face forward when said aircraft is in a forward flight mode and the rotors are in a forward configuration, and wherein said front side of said rotors face upwards when said rotors are in a hover configuration;

descending the aircraft with the rotors in a hover configuration such that the airflow flows up through the rotor blades of said rotors from the back side of said rotors;

preparing the battery or batteries for flare control, wherein the step of preparing the battery or batteries for flare control comprises heating up the battery by 10-20° C. prior to the step of arresting the aircraft motion;

controlling the aircraft descent rate; and arresting the aircraft motion wherein arresting the aircraft motion comprises using an arresting flare, said arresting flare providing a burst of power prior to touchdown.

2. The method of claim 1 wherein the step of arresting the vehicle motion further comprises the steps of:

determining a translational velocity of the aircraft;

determining a maximum instantaneous power of the battery or batteries; and controlling the rotors at up to the maximum instantaneous power to arrest a vertical rate of the aircraft.

3. The method of claim 1 further comprising the step of determining a landing approach mode.

4. A method for landing an electrically powered tiltrotor aircraft in a deep discharge battery condition said aircraft comprising rotors and a battery or batteries, said method comprising the steps of:

determining a landing approach mode, wherein said landing approach mode is a vertical landing approach mode;

beginning a descent with rotors in a hover configuration, said rotors having a front side and a back side opposite said front side, wherein said front side of said rotors face forward when said aircraft is in a forward flight mode and the rotors are in a forward configuration, and wherein said front side of said rotors face upwards when said rotors are in a hover configuration;

descending the aircraft with the rotors in a hover configuration such that the airflow flows up through the rotor blades of said rotors from the back side of said rotors;

preparing the battery or batteries for flare control, wherein the step of preparing the battery or batteries for flare control comprises idling the battery;

controlling the aircraft descent rate; and arresting the aircraft motion wherein arresting the aircraft motion comprises using an arresting flare, said arresting flare providing a burst of power prior to touchdown.

5. The method of claim 4 wherein the step of arresting the vehicle motion further comprises the steps of:

determining a translational velocity of the aircraft;

determining a maximum instantaneous power of the battery or batteries; and controlling the rotors at up to the maximum instantaneous power to arrest a vertical rate of the aircraft.

6. A method for landing an electrically powered tiltrotor aircraft in a deep discharge battery condition, said aircraft comprising rotors and a battery or batteries, said rotors comprising propellers with a plurality of variable pitch blades, said method comprising the steps of:

determining a landing approach mode, wherein said landing approach mode is a vertical landing approach mode;

determining a descent trajectory;

beginning a descent with rotors in a hover configuration, said rotors having a front side and a back side opposite said front side, wherein said front side of said rotors face forward when said aircraft is in a forward flight mode and the rotors are in a forward configuration, and wherein said front side of said rotors face upwards when said rotors are in a hover configuration;

descending the aircraft with the rotors in a hover configuration such that the airflow flows up through the rotor blades of said rotors from the back side of said rotors;

preparing the battery or batteries for flare control, wherein the step of preparing the battery or batteries for flare control comprises:

selecting a blade pitch angle for regenerating energy during the descent; and regenerating energy using the rotors of the aircraft;

controlling the aircraft descent rate; and arresting the aircraft motion wherein arresting the aircraft motion comprises using an arresting flare, said arresting flare providing a burst of power prior to touchdown.

7. The method of claim 6 wherein the step of arresting the vehicle motion further comprises the steps of:

determining a translational velocity of the aircraft;

determining a maximum instantaneous power of the battery or batteries; and controlling the rotors at up to the maximum instantaneous power to arrest a vertical rate of the aircraft.

8. A method for landing an electrically powered tiltrotor vertical take-off and landing aircraft, said aircraft comprising rotors and a battery or batteries, said method comprising the steps of:

determining a landing approach mode, wherein said landing approach mode is a vertical landing approach mode;

determining satisfaction of a deep discharge condition;

determining a descent trajectory;

beginning a descent with rotors in a hover configuration, said rotors having a front side and a back side opposite said front side, wherein said front side of said rotors face forward when said aircraft is in a forward flight mode and the rotors are in a forward configuration, and wherein said front side of said rotors face upwards when said rotors are in a hover configuration;

descending the aircraft with the rotors in a hover configuration such that the airflow flows up through the rotor blades of said rotors from the back side of said rotors;

preparing the battery or batteries for flare control;

controlling the vehicle descent rate; and arresting the aircraft motion wherein arresting the aircraft motion comprises using an arresting flare, said arresting flare providing a burst of power prior to touchdown.

9. The method of claim 8 wherein the step of preparing the battery or batteries for flare control comprises thermally conditioning the battery prior to the step of arresting the vehicle motion.

10. The method of claim 8 wherein the step of preparing the battery or batteries for flare control comprises idling the battery.

11. The method of claim 8 wherein the step of preparing the battery or batteries for flare control comprises regenerating energy using the rotors of the aircraft.

12. The method of claim 11 wherein the step of determining satisfaction of a deep discharge condition comprises a determination that there is no significant hover time remaining.

13. The method of claim 12 wherein the step of arresting the vehicle motion further comprises the steps of:

determining a translational velocity of the aircraft;

determining a maximum instantaneous power of the battery or batteries; and controlling the rotors at up to the maximum instantaneous power to arrest a vertical rate of the aircraft.

14. The method of claim 13 further comprising the steps of:

determining a landing approach mode; and determining a descent trajectory.

15. The method of claim 8 wherein the step of determining satisfaction of a deep discharge condition comprises a determination that there is no significant hover time remaining.

16. The method of claim 8 wherein the step of arresting the vehicle motion further comprises the steps of:

determining a translational velocity of the aircraft;

determining a maximum instantaneous power of the battery or batteries; and controlling the rotors at up to the maximum instantaneous power to arrest a vertical rate of the aircraft.

17. The method of claim 8 further comprising the steps of:

determining a landing approach mode; and determining a descent trajectory.

* * * * *